US 6,724,930 B1

(12) United States Patent
Kosaka et al.

(10) Patent No.: US 6,724,930 B1
(45) Date of Patent: Apr. 20, 2004

(54) THREE-DIMENSIONAL POSITION AND ORIENTATION SENSING SYSTEM

(75) Inventors: Akio Kosaka, Hachioji (JP); Akito Saito, Hino (JP); Takao Shibasaki, Tokyo (JP); Takeo Asano, Kunitachi (JP); Hiroshi Matsuzaki, Hachioji (JP); Yukihito Furuhashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/498,963

(22) Filed: Feb. 4, 2000

(30) Foreign Application Priority Data

Feb. 4, 1999 (JP) .......................... 11-027359

(51) Int. Cl.$^7$ ................................ G06K 9/00
(52) U.S. Cl. ...................... 382/154; 382/291
(58) Field of Search .................. 382/154, 287, 382/298, 291, 216; 356/12, 13, 14; 348/95; 345/95

(56) References Cited

U.S. PATENT DOCUMENTS

| | | | | |
|---|---|---|---|---|
| 5,138,667 A | * | 8/1992 | Roch et al. ............... | 382/112 |
| 5,440,392 A | * | 8/1995 | Pettersen et al. ........... | 356/620 |
| 5,531,520 A | * | 7/1996 | Grimson et al. ........... | 382/131 |
| 5,751,843 A | * | 5/1998 | Maggioni et al. .......... | 382/154 |
| 5,828,770 A | * | 10/1998 | Leis et al. ................ | 382/103 |
| 5,832,139 A | * | 11/1998 | Batterman et al. ......... | 382/291 |
| 5,905,806 A | * | 5/1999 | Eberhard et al. .......... | 382/100 |
| 5,921,992 A | * | 7/1999 | Costales et al. ........... | 606/130 |
| 6,013,308 A | * | 1/2000 | Saito ...................... | 427/8 |
| 6,144,761 A | * | 11/2000 | Kaneko et al. ............ | 382/154 |
| 6,175,647 B1 | * | 1/2001 | Schick et al. ............. | 382/154 |
| 6,222,937 B1 | * | 4/2001 | Cohen et al. .............. | 382/154 |
| 6,304,680 B1 | * | 10/2001 | Blake et al. ............... | 382/285 |
| 6,324,296 B1 | * | 11/2001 | McSheery et al. ......... | 382/107 |
| 6,363,169 B1 | * | 3/2002 | Ritter et al. .............. | 382/154 |

FOREIGN PATENT DOCUMENTS

JP 7-98208 4/1995

OTHER PUBLICATIONS

Martin A. Fischler et al., "Random Sample Consensus: A Paradigm for Model Fitting with Applications to Image Analysis and Automated Cartography," SRI International.
William A. Hoff et al., "Computer vision–based registration techniques for augmented reality," SPIE, vol. 2904.
Krisnawan Rahardja et al.,"Vision–Based Bin–Picking: Recognition and Localization of Multiple Complex Objects Using Simple Visual Cues," Robot Vision Laboratory.

(List continued on next page.)

Primary Examiner—Daniel Mariam
Assistant Examiner—Shefali Patel
(74) Attorney, Agent, or Firm—Scully, Scott, Murphy & Presser

(57) ABSTRACT

A three-dimensional position and orientation sensing apparatus including: an image input section which inputs an image acquired by an image acquisition apparatus and showing at least three markers having color or geometric characteristics as one image, three-dimensional positional information of the markers with respect to an object to be measured being known in advance; a region extracting section which extracts a region corresponding to each marker in the image; a marker identifying section which identifies the individual markers based on the color or geometric characteristics of the markers in the extracted regions; and a position and orientation calculating section which calculates the three-dimensional position and orientation of the object to be measured with respect to the image acquisition apparatus, by using positions of the identified markers in the image input to the image input section, and the positional information of the markers with respect to the object to be measured.

40 Claims, 7 Drawing Sheets

OTHER PUBLICATIONS

Berthold K.P. Horn et al.,"Closed–form solution of absolute orientation using orthonormal matrices," J. Optical Society of America, vol. 5 No. 7, (1988).

Theo Pavlidis et al.,"Intergrating Region Growing and Edge Detection," IEEE Transactions of Pattern Analysis and Machine Intelligence, vol. 12, No. 3, (1990).

* cited by examiner

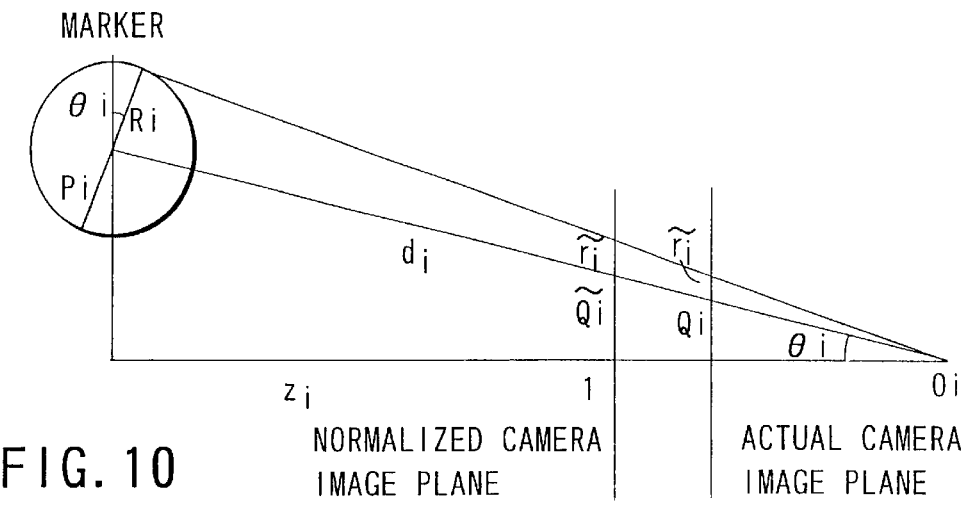
FIG. 10
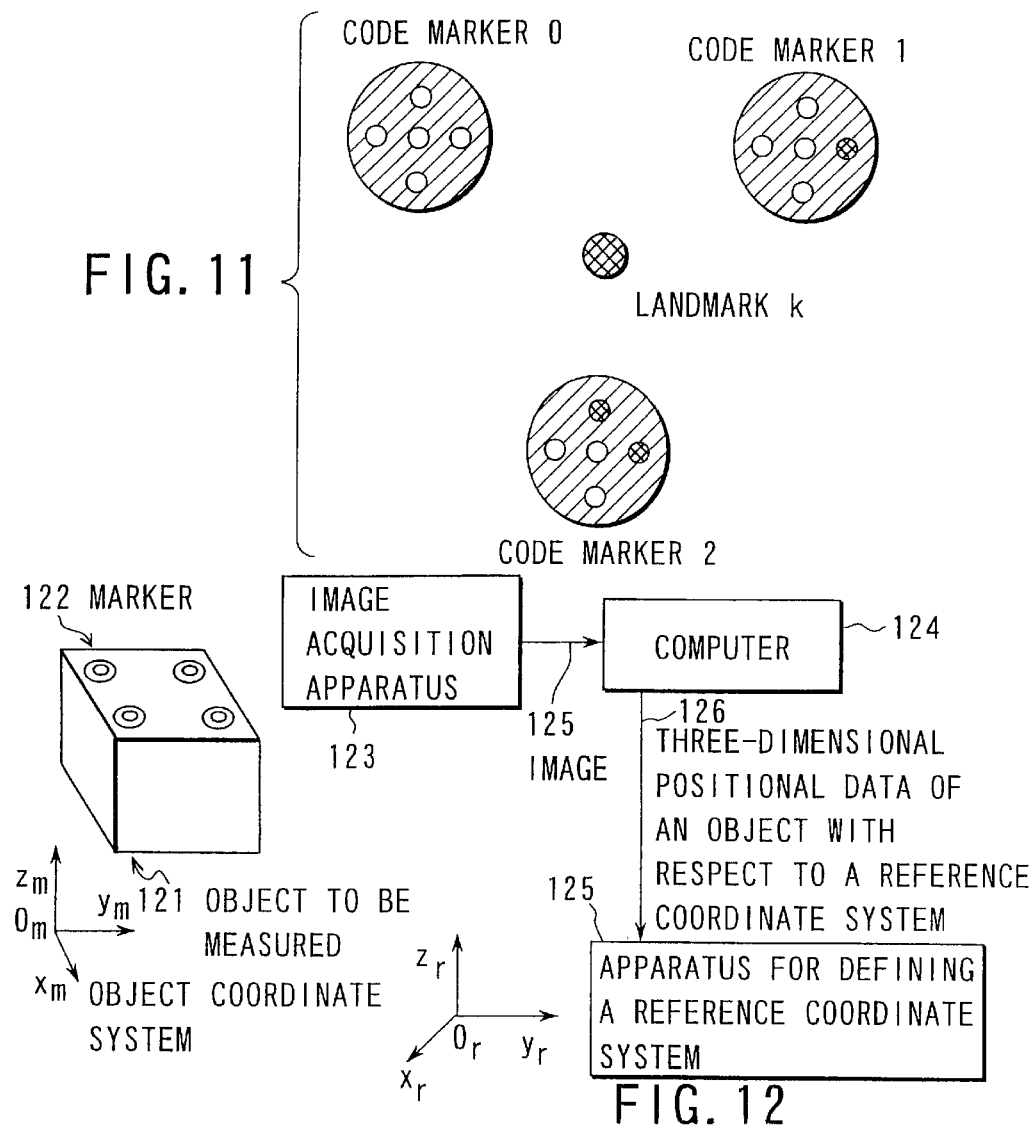
FIG. 11
FIG. 12

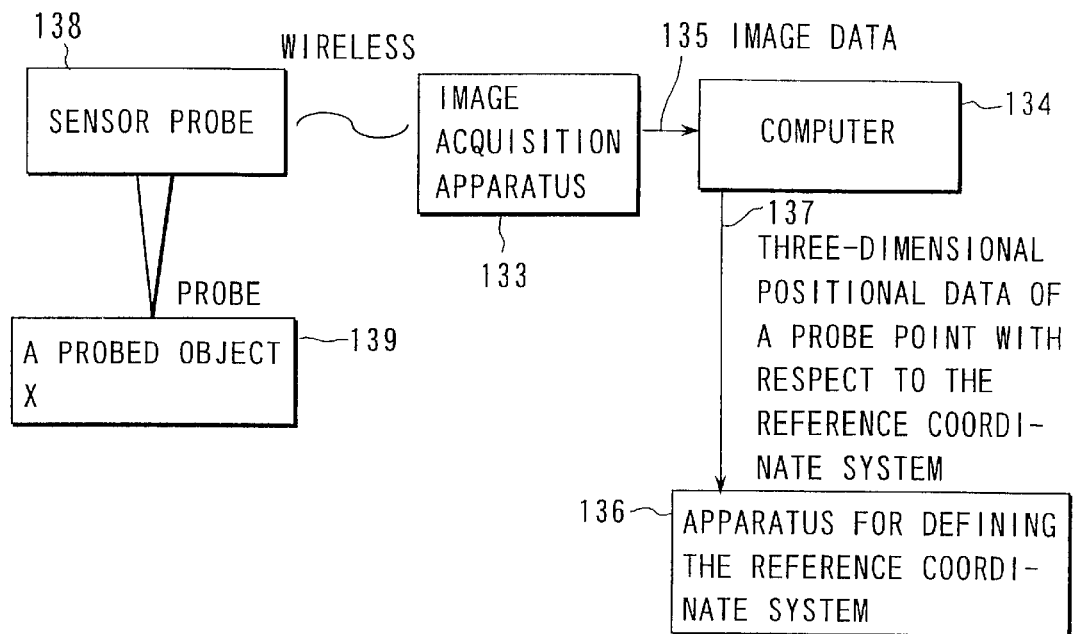
FIG. 13
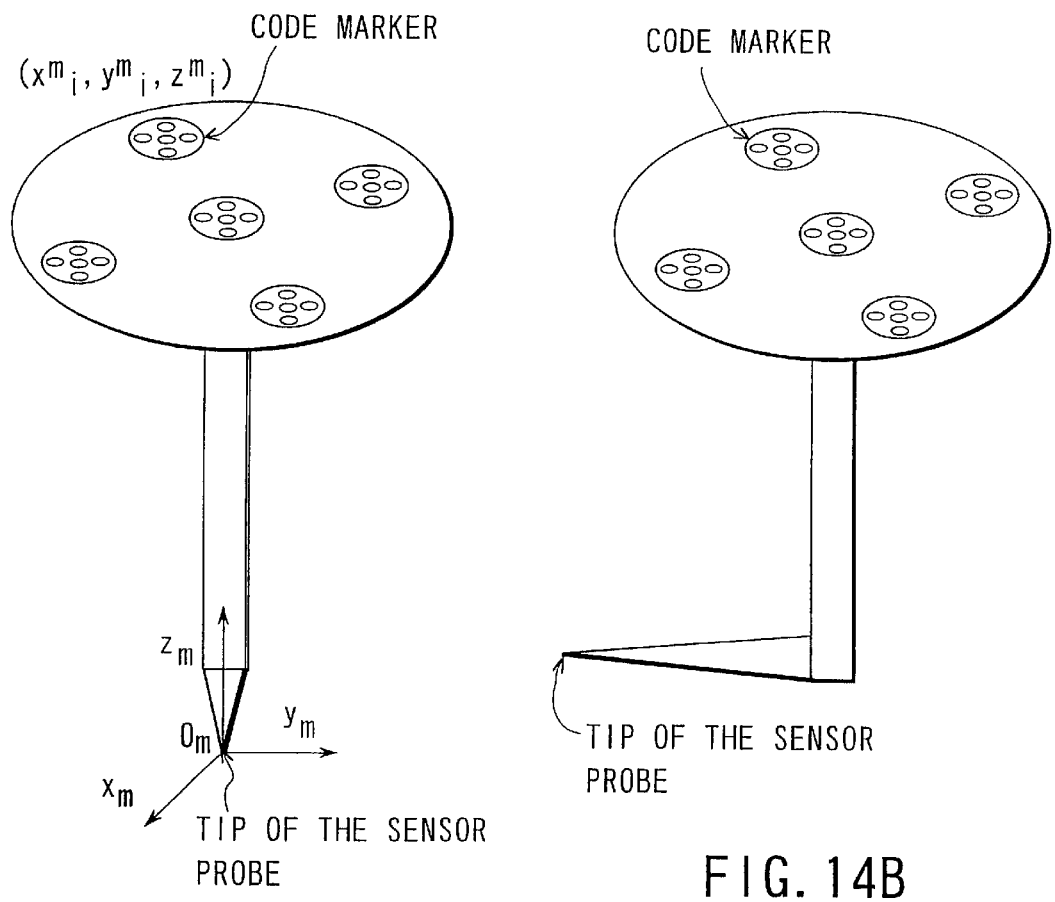
FIG. 14A
FIG. 14B

THREE-DIMENSIONAL POSITION AND ORIENTATION SENSING SYSTEM

CROSS-REFERENCE TO RELATED APPLICATION

This application is based upon and claims the benefit of priority from the prior Japanese Patent Application No. 11-027359, filed Feb. 4, 1999, the entire contents of which are incorporated herein by reference.

BACKGROUND OF THE INVENTION

The present invention relates to a three-dimensional position and orientation sensing system, and relates, more particularly, to a three-dimensional position and orientation sensing apparatus, a three-dimensional position and orientation sensing method, and a three-dimensional position and orientation sensing system to be used for them, including a computer-readable recording medium, a marker and a probe, for sensing a three-dimensional position and orientation of an object by estimating the three-dimensional position and orientation of the object by the use of an image acquisition apparatus.

In general, the subject of estimating a relative position and orientation between an object and an image acquisition apparatus by recognizing at least three landmarks or markers on the object based on the extraction of these landmarks or markers from the image, is considered a part of an n-point subject, where relative positions of the landmarks are known in advance. (Refer to the literature 1: M. A. Fischler and R. C. Bolles, "Random sample consensus: A paradigm for model fitting with applications to image analysis and automated cartography," Communications of the ACM, Vol. 24, No. 6, June 1981, pp. 381–395.)

In this case, it has been known that when there are only three landmarks, there exist a plurality of solutions.

As a method for solving this problem, there can be pointed out a method as disclosed in Jpn. Pat. Appln. KOKAI Publication No. 7-98208, which utilizes specific markers.

The method disclosed in Jpn. Pat. Appln. KOKAI Publication No. 7-98208 utilizes a positional relationship between one large circle and one small circle.

Further, as another method, there is a system for estimating a three-dimensional position and orientation from an image acquired by a camera by utilizing a plurality of markers of the same shape, as disclosed in the second literature (Refer to the literature 2: W. A. Hoff, T. Lyon, and K. Nguyen, "Computer Vision-Based Registration Techniques for Augmented Reality", Proc. of Intelligent Robots and Computer Vision XV, Lol. 2904, in Intelligent Systems and Advanced Manufacturing, SPIE, Boston, Mass., November 19–21, pp. 538–548, 1996.)

However, according to the technique used in the above-described Jpn. Pat. Appln. KOKAI Publication No. 7-98208, as the markers are basically defined by only one large circle and one small circle defined near this large circle, there are following drawbacks.
(1) When the sizes of the one large circle and one small circle are small respectively in the image, the error of measurement becomes larger.
(2) When it is not possible to recognize the one large circle and one small circle because of occlusion or because of a limit in the image processing, it is not possible to recognize the position and orientation.

Further, according to the above-described literature 2, when a plurality of markers are structured by the same patterns, in many cases, it is difficult to identify the individual markers in many cases.

The identification becomes more difficult when it is not possible to recognize a part of the markers because of occlusion or the like.

Further, when an object is located in a complex environment, there are many cases where there exist other patterns that are similar to those of the markers, when the markers are structured in a single color or in only black or white color. Therefore, it has been difficult to identify the markers from non-marker items.

BRIEF SUMMARY OF THE INVENTION

In the light of the above-described problems, it is an object of the present invention to provide a three-dimensional position and orientation sensing apparatus, a three-dimensional position and orientation sensing method, and a three-dimensional position and orientation sensing system to be used for them, including a computer-readable recording medium, a marker and a probe, which (1) can estimate the three-dimensional position and orientation of an object, even when a part of markers cannot be observed because of occlusion or the like, and (2) can estimate the position and orientation from only three markers, by which it has not been possible to achieve by finding a firm solution according to the prior-art n-point subject.

In order to achieve the above object, a first aspect of the present invention provides a three-dimensional position and orientation sensing apparatus comprising:

image input means for inputting an image acquired by an image acquisition apparatus and having at least three markers, three-dimensional positional information of which with respect to an object to be measured is known in advance;

region extracting means for extracting a region corresponding to each marker on the image;

marker identifying means for identifying the individual markers from the characteristics of the appearance of the markers in the extracted regions; and position and orientation calculating means for calculating a three-dimensional position and orientation of the object to be measured with respect to the image acquisition apparatus, by using positions of the identified markers on the image, and the three-dimensional positional information of the markers with respect to the object to be measured.

Further, a second aspect of the invention provides a three-dimensional position and orientation sensing method for measuring the position and orientation of an object to be measured with respect to an image acquisition apparatus, by analyzing an image acquired by this image acquisition apparatus, the method comprising the steps of:

inputting an image acquired by an image acquisition apparatus and having at least three markers, three-dimensional positional information of which with respect to an object to be measured is known in advance;

extracting a region corresponding to each marker on the image;

identifying the individual markers from the characteristics of the appearance of the markers in the extracted regions; and calculating a three-dimensional position and orientation of the object to be measured with respect to the image acquisition apparatus, by using positions of the identified markers on the image, and the three-dimensional positional information of the markers with respect to the object to be measured.

Further, a third aspect of the invention provides an article of manufacture comprising a computer-readable recording medium having computer-readable program coding means as a processing program recorded for measuring the position and orientation of an object to be measured with respect to an image acquisition apparatus, by analyzing by computer an image acquired by this image acquisition apparatus, the computer-readable program coding means comprising:

computer-readable programming means for making an image to be input, the image having been acquired by the image acquisition apparatus and having at least three markers, three-dimensional positional information of which with respect to an object to be measured is known in advance;

computer-readable programming means for making an area corresponding to each marker on the image to be extracted;

computer-readable programming means for making the individual markers to be identified from the characteristics of the appearance of the markers in the extracted regions; and computer-readable programming means for making the three-dimensional position and orientation of the object to be measured with respect to the image acquisition apparatus to be calculated, by using positions of the identified markers on the image, and the three-dimensional positional information of the markers with respect to the object to be measured.

Further, a fourth aspect of the invention provides markers having identification marks disposed on their planes, wherein the external shapes of the identification marks are circular.

Further, a fifth aspect of the invention provides a probe to be used for measuring a position, the probe comprising:

a contacting portion as a member for contacting an object to be measured; and a mark portion having identification marks for identifying the probe disposed on the plane of the mark.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

FIG. 10 is a view for showing a decision made that $Q_i$ is the center of a marker image when the center of the maker is $P_i$, the focal point of a camera is $O_c$, and an intersection point between the camera image plane and $O_c P_i$ is $Q_i$, in the second embodiment of the invention.

FIG. 11 is a view for showing one example of extracting a landmark from an image in a fourth embodiment of the invention.

FIG. 12 is a block diagram for showing a structure estimated in a fifth embodiment of the invention.

FIG. 13 is a block diagram for showing a structure according to a sixth embodiment of the invention.

FIG. 14A and FIG. 14B are views for showing examples of a sensor probe 138 according to the sixth embodiment.

DETAILED DESCRIPTION OF THE INVENTION

Figure 1:
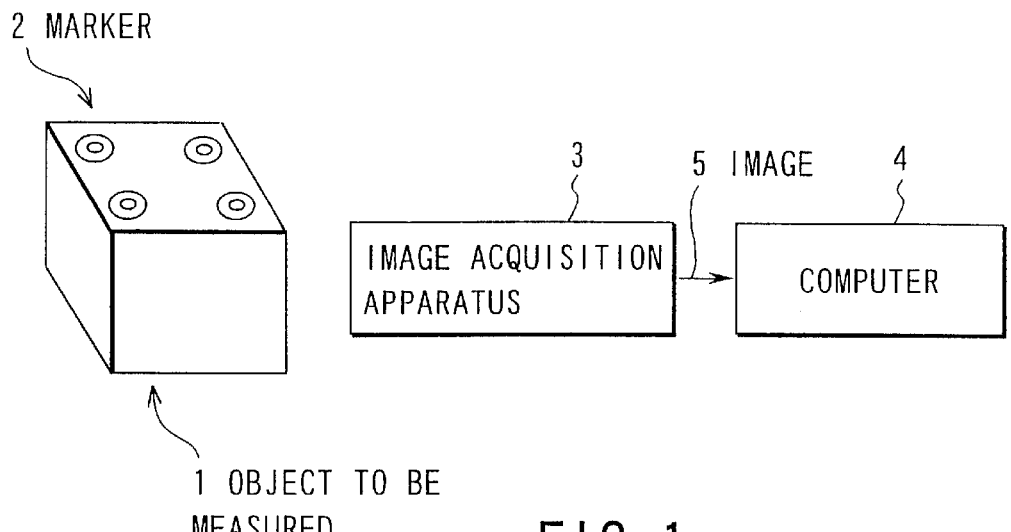
FIG. 1 is a block diagram for showing a structure of a three-dimensional position and orientation sensing apparatus according to a first embodiment of the present invention.

Reference will now be made in detail to the presently preferred embodiments of the invention as illustrated in the accompanying drawings, in which like reference numerals designate like or corresponding parts.

(First Embodiments)

A first embodiment of the present invention will be explained below with reference to FIG. 1 to FIG. 8.

FIG. 1 is a block diagram for showing a structure of a three-dimensional position and orientation sensing apparatus according to the first embodiment of the present invention.

As illustrated in FIG. 1, a plurality of markers 2 (hereinafter to be abbreviated as code markers) having unique geometric characteristics are disposed on or near an object of which three-dimensional position and orientation is to be estimated.

These code markers 2 are photographed by an image acquisition apparatus 3, and a photographed image 5 is transferred to within a computer 4.

In this case, the image acquisition apparatus 3 may be a general TV camera or a digital video camera. Also, the computer 4 for receiving the image 5 from the image acquisition apparatus 3 may be a general computer or a special image processing apparatus.

When a TV camera as the image acquisition apparatus 3 outputs an analog signal, a device or a unit for converting the image 5 into a digital signal may be included in the computer 4.

When the image acquisition apparatus 3 is a digital camera or a digital video camera, the computer 4 may input the image 5 as a digital signal by directly transferring the image 5 from the camera to the computer 4.

As explained above, according to the three-dimensional position and orientation sensing apparatus of the first embodiment, the computer 4 receives the acquired image 5 having the code markers 2 received from the image acquisition apparatus 3, converts this image into a digital image, processes this digital image thereby to recognize the code markers 2 from within the image 5, and thus estimates the three-dimensional position and orientation of the object 1 with respect to the image acquisition apparatus 3, by utilizing the positions of the code markers in the image and the three-dimensional positions of the markers registered in advance.

In the present embodiment, an explanation will be made of the method for estimating the position and orientation of an object when at least four code markers can be identified.

A case where at least three code markers can be identified will be explained in other embodiment.

A basic handling of the image and coordinate transformation in the present embodiment will be explained below.

In principle, the object 1 and the image acquisition apparatus 3 have their own coordinate systems, and the image 5 acquired by the image acquisition apparatus 3 is defined as a camera image plane.

Figure 2:
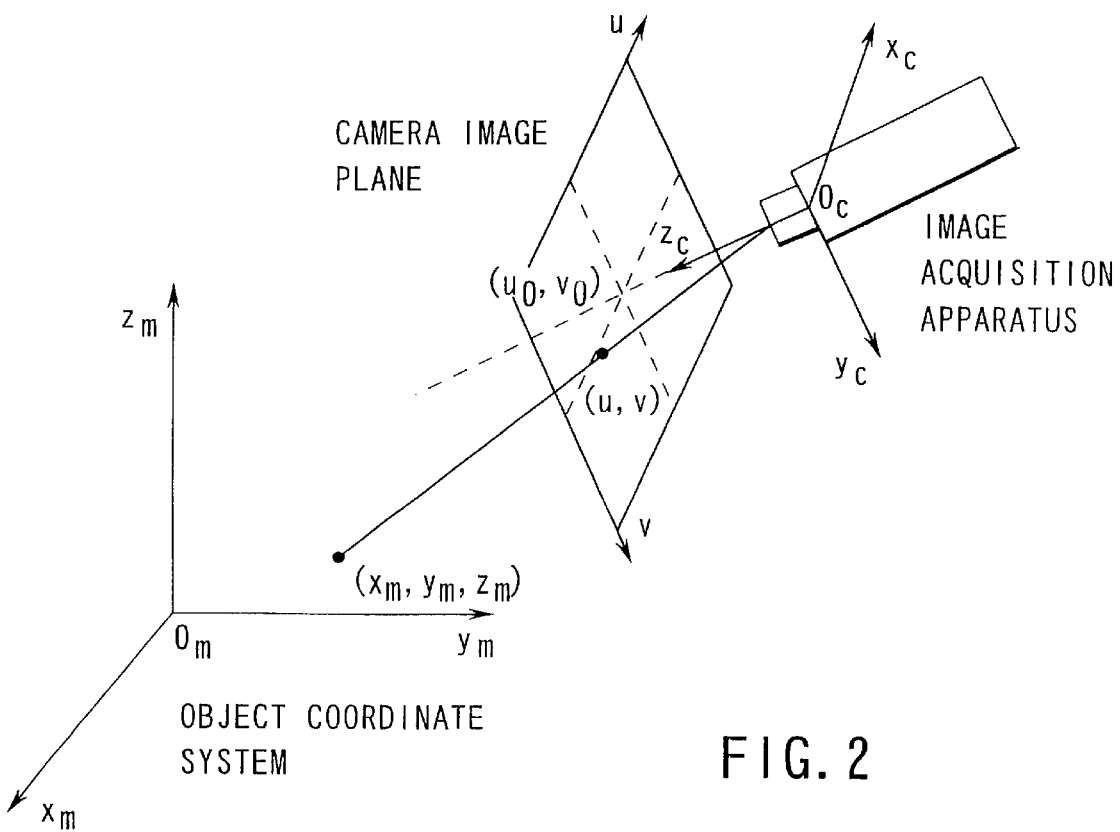
FIG. 2 is a view for showing a relationship between an image acquisition apparatus 3, a camera image plane, and an object coordinate system defined by an object 1 shown in FIG. 1.

FIG. 2 is a view for showing a relationship between the image acquisition apparatus 3, the camera image plane, and the object coordinate system defined by the object 1.

In this case, the object coordinate system defined by the object 1 has origin $O_m$ and has three-dimensional coordinates $(x_m, y_m, z_m)$.

On the other hand, the camera coordinate system defined by the image acquisition apparatus 3 has origin $O_c$ and has three-dimensional coordinates $(x_c, y_c, z_c)$.

The camera image plane has its axis specified by u axis and v axis. The u axis is taken in parallel with the $x_c$ axis of the camera coordinate system, and the v axis is taken in parallel with the $y_c$ axis. The $z_c$ axis for defining the camera coordinate system coincides with the optic axis of the optical system of the image acquisition apparatus 3, and a point (the center of the camera image plane) at which the optic axis crosses the camera image plane is defined as $(u_o, v_o)$.

The subject of estimating the three-dimensional position and orientation of the object 1 with respect to the image acquisition apparatus 3 becomes the subject of estimating the position and orientation of the object coordinate system with respect to the camera coordinate system. In other words, this subject becomes the subject of calculating coordinate transformation parameters from the object coordinate system to the camera coordinate system, or calculating coordinate transformation parameters from the camera coordinate system to the object coordinate system.

This relationship can be expressed as the Expression 1 by utilizing the homogeneous transformation matrix $_cH_m$ or $_mH_c$, as follows.

(Expression 1)

$$\begin{bmatrix} x_c \\ y_c \\ z_c \\ 1 \end{bmatrix} = {}_cH_m \begin{bmatrix} x_m \\ y_m \\ z_m \\ 1 \end{bmatrix} = \begin{bmatrix} R & t \\ 0 & 1 \end{bmatrix} \begin{bmatrix} x_m \\ y_m \\ z_m \\ 1 \end{bmatrix} = \begin{bmatrix} r_{11} & r_{12} & r_{13} & t_x \\ r_{21} & r_{22} & r_{23} & t_x \\ r_{31} & r_{32} & r_{33} & t_x \\ 0 & 0 & 0 & 1 \end{bmatrix} \begin{bmatrix} x_m \\ y_m \\ z_m \\ 1 \end{bmatrix} \quad (1)$$

-continued $$\begin{bmatrix} x_m \\ y_m \\ z_m \\ 1 \end{bmatrix} = {}_cH_m \begin{bmatrix} x_c \\ y_c \\ z_c \\ 1 \end{bmatrix} = \begin{bmatrix} R' & t' \\ 0 & 1 \end{bmatrix} \begin{bmatrix} x_c \\ y_c \\ z_c \\ 1 \end{bmatrix} = \begin{bmatrix} r'_{11} & r'_{12} & r'_{13} & t'_x \\ r'_{21} & r'_{22} & r'_{23} & t'_x \\ r'_{31} & r'_{32} & r'_{33} & t'_x \\ 0 & 0 & 0 & 1 \end{bmatrix} \begin{bmatrix} x_c \\ y_c \\ z_c \\ 1 \end{bmatrix} \quad (2)$$

where $R=(r_{ij})$ and $R'=(r'_{ij})$ represent rotation matrices of 3×3 respectively, and $t=(t_x, t_y, t_z)$ and $t'=(t'_x, t'_y, t'_z)$ represent three-dimensional translation vectors respectively.

For markers $\{M_i; i=1, 2, \ldots, m\}$ to be explained in detail next, their three-dimensional positions in the object coordinate system have been measured in advance, and they are expressed as $(x_i^m, y_i^m, z_i^m)$.

Further, their positions within the image are described as $(u_i, v_j)$.

Then, when the image acquisition apparatus 3 is approximated by a pinhole camera model, the following relationship between these coordinates is obtained:

(Expression 2)

$$\begin{bmatrix} U_i \\ V_i \\ W_i \end{bmatrix} = \begin{bmatrix} \alpha_u & 0 & u_0 & 0 \\ 0 & \alpha_v & v_0 & 0 \\ 0 & 0 & 0 & 0 \end{bmatrix} {}_cH_m \begin{bmatrix} x_i^m \\ y_i^m \\ z_i^m \\ 1 \end{bmatrix} \quad (3)$$

$$u_i = \frac{U_i}{W_i} \quad v_i = \frac{V_i}{W_i} \quad (4)$$

where $(u_o, v_o)$ represents the image center, and $(\alpha_u, \alpha_v)$ represents the magnification factors in the u direction and the v direction. They are called intrinsic camera parameters, and their values can be estimated by camera calibration.

Figure 3:
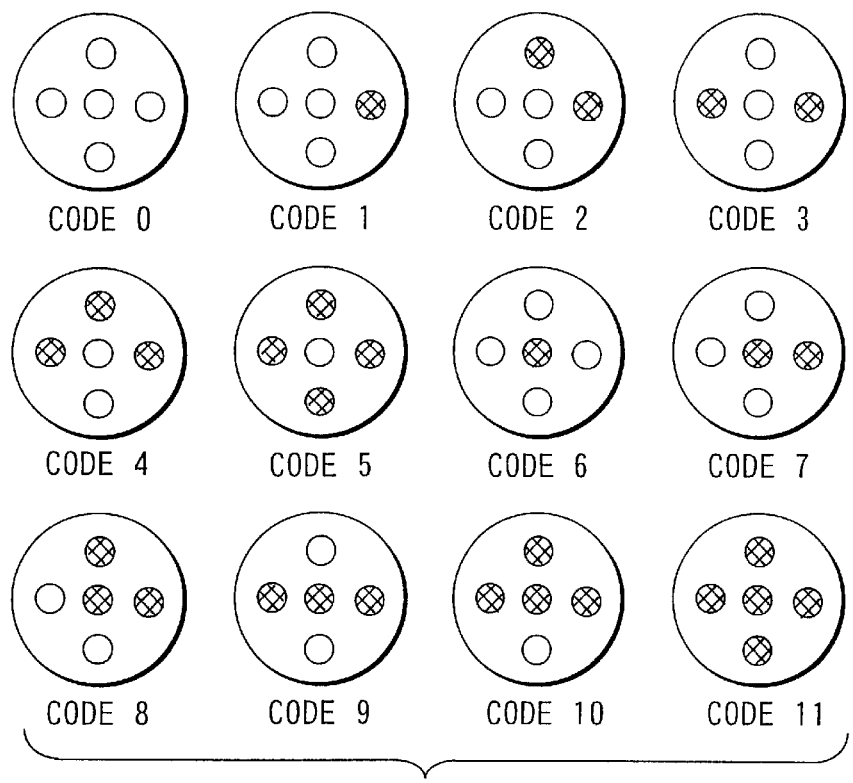
FIG. 3 is a view for showing one example of code markers 2 having geometric characteristics according to the first embodiment.

FIG. 3 shows one example of the code markers 2 having geometric characteristics in the present embodiment.

These code markers 2 have circular shapes. A pattern formed by small circles within each large circle shows each code.

In this example, there is one small circle at the center of each large circle, and four small circles are disposed around this center circle.

A unique label can be provided to each marker by a code formed by the five black and white (or color) circles.

For example, in the case of FIG. 3, it is possible to generate twelve different codes from code 0 to code 11.

Figure 4:
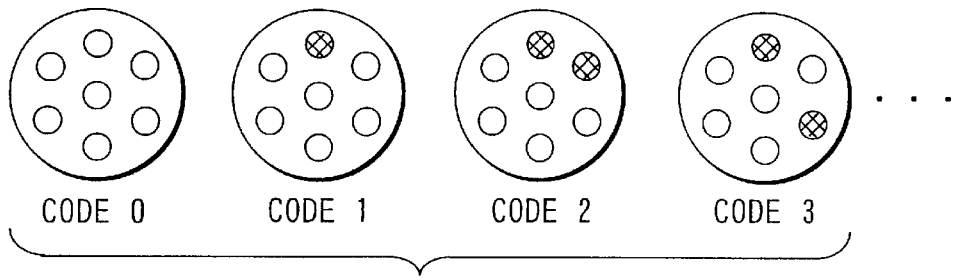
FIG. 4 is a view for showing another code pattern according to the first embodiment.

FIG. 4 illustrates another example of a code pattern according to the present embodiment.

In the case of this code pattern, seven small circles are disposed within one large circle to generate various kinds of codes.

Figure 5:
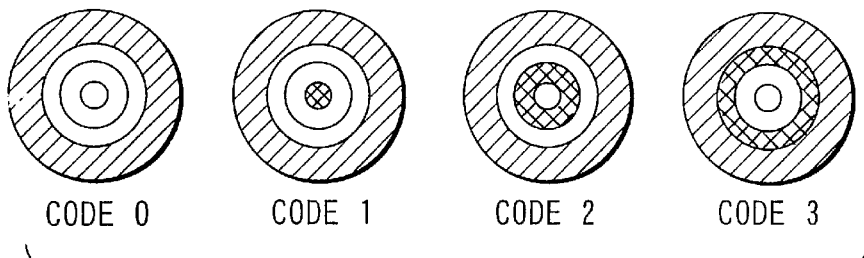
FIG. 5 is a view for showing still another code pattern according to the first embodiment.

Patterns for generating codes are not limited to the above, but there may also be other patterns such as the one as illustrated in FIG. 5, for example, where codes are organized concentrically.

In this case, what is basically important is that each marker has geometric characteristics, and that each marker can generate a code for making it possible to assign a label to each marker.

Further, a marker itself does not need to have a circular shape, but may have a square shape or a regular polygonal shape, for example.

Figure 6:
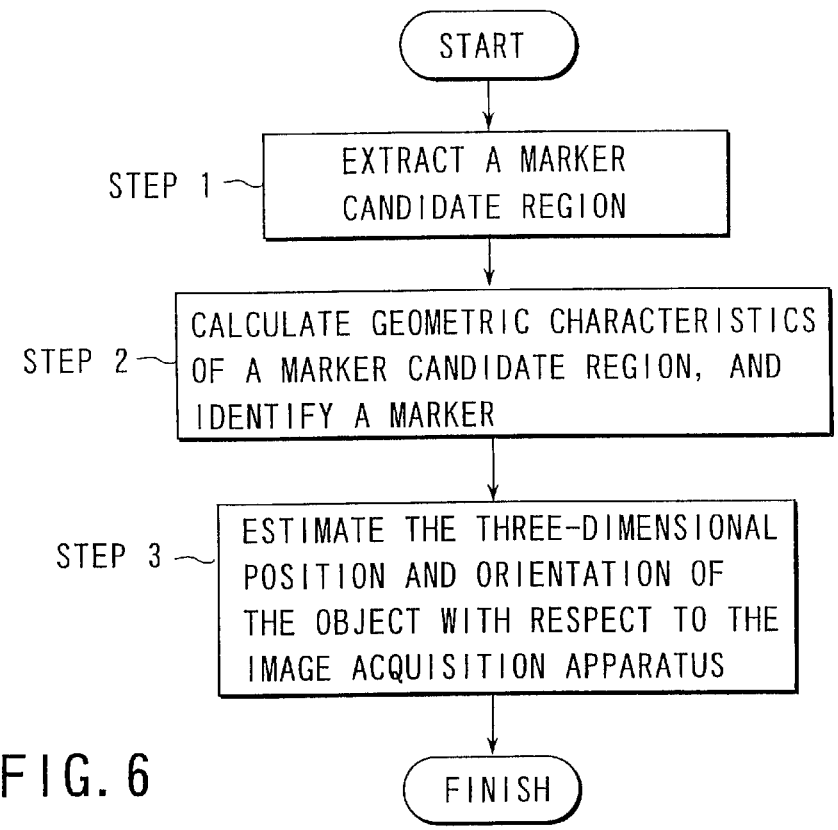
FIG. 6 is a flowchart for showing a processing procedure for estimating the three-dimensional position and orientation of the object 1 according to the first embodiment.

FIG. 6 is a flowchart for showing a processing procedure for estimating a three-dimensional position and orientation of the object 1 after the image 5 has been input to the computer 4 according to the present invention.

Each step will be explained briefly.

(1) Step 1

After the computer 4 has received the image 5, the computer 4 extracts a candidate region that is estimated to be a region corresponding to the code marker 2, from within the image 5.

(2) Step 2

The computer 4 analyzes in detail the candidate region extracted at the step 1, and computes geometric characteristics corresponding to the code of the code marker 2 from the candidate region. When the code has been recognized, the computer registers the position within the image and the code by recognizing this region as the marker region.

(3) Step 3

The computer 4 calculates a three-dimensional position and orientation of the object 1 with respect to the image acquisition apparatus 3, by utilizing the two-dimensional image position of the code marker 2 extracted from the image registered at the step 2 and the three-dimensional position of this code marker 2 with respect to the object 1.

The steps 1, 2 and 3 that become the center of the present embodiment will be explained in more detail.

Step 1:

In the present embodiment, it is assumed that the image acquisition apparatus 3 generates a color image, and that the code markers 2 consist of such code markers (a combination of a large circle and small circles) as shown in FIG. 3.

In this case, it is assumed that the background color of the large circle is made up of a certain prescribed color, and that this color is a unique color within the object 1.

It is also assumed that a pattern formed by small circles consists of only white or black color.

As the area of a marker consists of a single color, it is assumed that color filters sensitive to this single color is introduced into an algorithm.

More specifically, three vectors corresponding to the following Expression 3 are calculated from measured values R (red), G (green) and B (blue) of three filters for constituting a color image with respect to an image point defined by the image plane coordinates (u, v).

(Expression 3)

$$i=(R+G+B)/3,\ r=R/(R+G+B),\ g=G/(R+G+B)$$

Then, a permissible value of a color pattern within the image that the marker can take is computed. In other words, an image region that satisfies the following Expression 4 is extracted.

(Expression 4)

$$i_{min}<i<i_{max}$$

$$r_{min}<r<r_{max}$$

$$g_{min}<g<g_{max}$$

In this case, values of $i_{min}$, $i_{max}$, $r_{min}$, $r_{max}$, $g_{min}$, and $g_{max}$ are set in advance.

Next, the region is filled thereby to determine the region corresponding to the marker.

Step 2:

Next, a decision is made as to whether or not the extracted region is the image of the marker.

In principle, as the marker has a circular shape, it is possible that the region within the image, that is a projected image of the marker, is approximated by an elliptic shape.

Accordingly, at the step 2, it is decided whether it is possible or not to approximate the marker region by an elliptic shape.

This method is based on a method as described in the literature 3 (K. Rahardja and A. Kosaka "Vision-based bin-picking: Recognition and localization of multiple complex objects using simple visual cues, "Proceedings of 1996 IEEE/RSJ International Conference on Intelligent Robots and Systems, Osaka, Japan, November 1996).

Specifically, the following procedure is taken.

(1) An elliptic region, including each region considered as a marker candidate region, is extracted, and the marker candidate region is labeled as 1 and other region is labeled as 0.

The region labeled as 1 is filled in, and a small region expressed by the label 0 existing inside this elliptic region is excluded.

(2) The first moment $q_0$ (mean position) and the second moment M of the marker candidate region expressed by the label 1 are calculated.

(3) The set of boundary points of the marker candidate region expressed by the label 1 is expressed as A={q}. Then, for each point of A, a normalized distance d expressed by the following Expression 5 is calculated.

(Expression 5)

$$d=\sqrt{(q-q_0)^T M^{-1}(q-q_0)} \qquad (5)$$

(4) The mean value $\mu$ and the standard deviation $\sigma_d$ for the set A of d are calculated.

Then, when $\sigma_d$ is smaller than a certain threshold value, the region is registered as the marker region. Otherwise, $\sigma_d$ is not registered as the marker region.

As explained above, when the marker region is decided to have an elliptic shape, the extraction of a pattern considered within the elliptic region is carried out based on a three-value thresholding within the elliptic region.

Figure 7A:
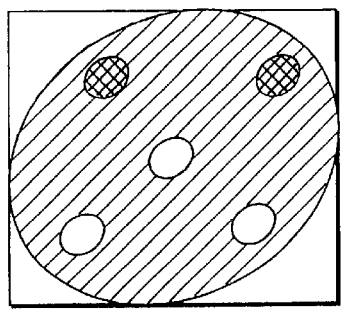
FIG. 7A to FIG. 7D are views for showing a process of extracting a code pattern according to the first embodiment.

More specifically, the following processing is carried out for the marker area shown in FIG. 7A.

Figure 7B:
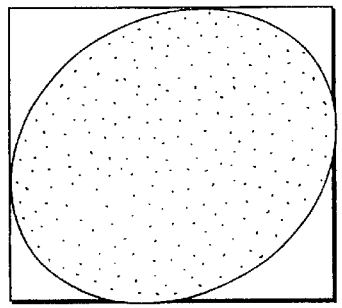

(1) From the filled-in marker area obtained at the step 1, a noise component is eliminated by applying a median filter, as shown in FIG. 7B.

(2) The mean value $\mu_g$ and the standard deviation $\sigma_g$ of a gray value (brightness) are calculated.

(3) By using a certain predetermined real number t with respect to a gray value g of each pixel within the region, the following labeling is carried out.

1) When $g-\mu_g>t\sigma_g$, this pixel is labeled as 1.

2) When $g-\mu_g<t\sigma_g$, this pixel is labeled as −1.

3) In cases other than 1) and 2) above, the pixel is labeled as 0.

Figure 7C:
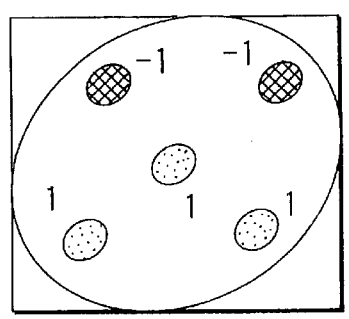

Within the region obtained in this way, small regions expressed by 1, −1 and 0 are extracted, as shown in FIG. 7C.

(4) Out of the small regions as labeled 1 or −1, a small region nearest to the center of the marker region is extracted.

This small region is called a center pattern. By utilizing this center pattern, the first moment $q_0$ and the second moment M of this region, a normalized distance and a normalized angle (an angle between patterns when the elliptic region is transformed into a circle region) from the center pattern to other patterns are calculated.

Figure 7D:
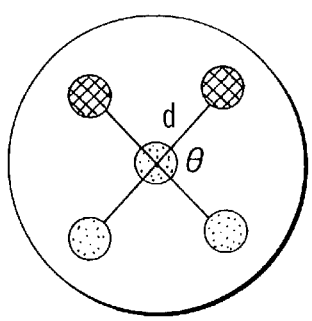

FIG. 7D illustrates a status of calculating the normalized distance and the normalized angle from the center pattern to other patterns.

While this normalized distance and the normalized angle between the patterns hold certain geometric constraints, this marker candidate region is recognized as the marker region.

By reading a code of the pattern formed by this small region, it is possible to identify the marker.

In the case of FIG. 7D, the pattern is recognized as the pattern of code 2 out of the code patterns shown in FIG. 3.

For the marker region identified in this manner, a centroid of the center pattern within the image is registered as the position of the code marker $(u_i, v_j)$ (i=1, 2, 3, . . . ).

Step 3:

How to calculate the homogeneous transformation matrix $_cH_m$ given by the Expression 3 is the subject of the step 3, when the marker intra-image position $(u_i, v_j)$ (i=1, 2, 3, . . . ) identified at the step 2 and the three-dimensional marker position $(x_i^m, y_i^m, z_i^m)$ in the object coordinate system are given.

This is basically carried out by altering the method shown in the above-described literature 1 (M. A. Fischler and R. C. Bolles, "Random sample consensus: A paradigm for model fitting with applications to image analysis and automated cartography," Communications of the ACM, Vol. 24, No. 6, June 1981, pp. 381–395).

In other words, according to the method introduced in the literature 1, any optional three markers that are not on a straight line are selected from the identified markers. By utilizing these three markers, a candidate solution of a coordinate transformation parameter for transforming between the camera coordinate system and the object coordinate system is calculated.

It has been known that there are at maximum four possible solutions as the coordinate transformation parameter. Therefore, according to the present invention, a verification of the solution is carried out for each of the four solutions by utilizing the markers not selected. Thus, the solutions are narrowed to find a correct solution. With this solution as an initial value, the solution is updated by utilizing all the markers.

This method will be explained briefly below.

Three markers that are not on a straight line within the image are selected from the identified markers, according to a certain selection criterion.

The following selection methods are considered, for example.

(1) A method of selecting three markers is such a way that the area of a triangle formed by the three points of these three markers becomes a maximum within the camera image plane.

(2) A method of selecting three markers is such a way that the minimum of the internal angles of a triangle formed by the three points of these three markers becomes a maximum within the camera image plane.

The markers obtained in one of the above methods are expressed as $M_i$ (i=1, 2, 3).

Figure 8:
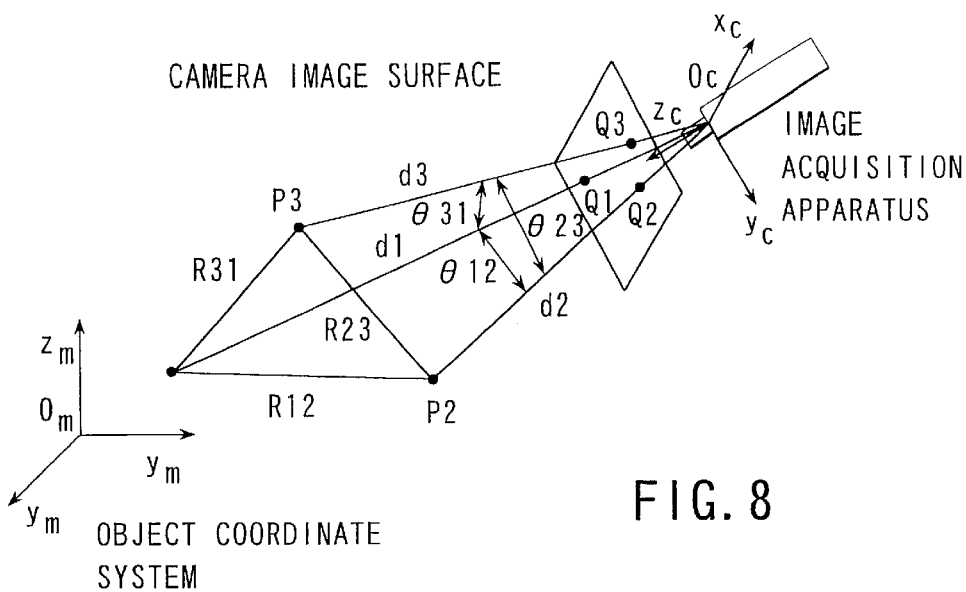
FIG. 8 is a view for showing three triangular $\Delta O_c M_i M_j$ estimated for three markers Mi obtained according to the first embodiment.

Next, three triangles $\Delta O_c M_i M_j$ (i, j=1, 2. 3; i≠j) as shown in FIG. 8 are considered with respect to the three markers $M_i$ (where it is assumed that three-dimensional positions in the model coordinate system is $P_i$, $(x_i^m, y_i^m, z_i^m)$, and the projected image position is $Q_i$ $(u_i, v_i)$).

It is assumed that, regarding these three triangles, the distance from the origin $O_c$ of the camera image system to each marker $M_i$ is $d_i$, and that the angle formed by the markers $M_i$ and $M_j$ and the camera coordinate system origin $O_c$ is $\theta_{ij}$.

Further, it is assumed that the distance between the markers $M_i$ and $M_j$ is $R_{ij}$.

In this case, distances $R_{12}$, $R_{23}$ and $R_{31}$ and angles $\theta_{12}$, $\theta_{23}$ and $\theta_{31}$ are known values, but $d_1$, $d_2$ and $d_3$ become unknown values.

In other words, it is possible to calculate the coordinate transformation parameters from the object coordinate system to the camera coordinate system, when it is possible to calculate the distances $d_1$, $d_2$ and $d_3$.

This will be explained below.

(1) A method of calculating the distances $R_{12}$, $R_{23}$ and $R_{31}$ $R_{12}$ is calculated as the Euclidean distance between the point $P_1$ and the point $P_2$.

Similarly, $R_{12}$ and $R_{31}$ are calculated as the Euclidean distances between the point $P_2$ and the point $P_3$ and between the point $P_3$ and the point $P_1$ respectively.

(2) A method for calculating the angles $\theta_{12}$, $\theta_{23}$ and $\theta_{31}$ The angle $\theta_{ij}$ formed by the markers $M_i$ and $M_j$ and the camera coordinate system origin $O_c$ can be calculated as follows.

It is assumed that $(\tilde{u}_i, \tilde{v}_i)$ are the normalized coordinate values of $(u_i, v_i)$.

This is given by the Expression 6-1.

(Expression 6-1)

$$\tilde{u}_i = \frac{u_i - u_0}{\alpha_u} \quad \tilde{v}_i = \frac{v_i - v_0}{\alpha_v}$$

Further, the normalized image point of $(\tilde{u}_i, \tilde{v}_i)$ corresponds to (xc, yc) corresponding to zc=1 in the camera coordinate system, and the angle formed by the vectors $(\tilde{u}_i, \tilde{v}_i, 1)$ and $(\tilde{u}_j, \tilde{v}_j, 1)$ is $\theta_{ij}$. Therefore, this is given by the Expression 6-2.

(Expression 6-2)

$$\cos\theta_{ij} = \frac{\tilde{u}_i\tilde{u}_j + \tilde{v}_i\tilde{v}_j + 1}{\sqrt{\tilde{u}_i^2 + \tilde{v}_i^2 + 1}\sqrt{\tilde{u}_j^2 + \tilde{v}_j^2 + 1}}$$

$$= \frac{\frac{u_i-u_0}{\alpha_u}\frac{u_j-u_0}{\alpha_u} + \frac{v_i-v_0}{\alpha_v}\frac{v_j-v_0}{\alpha_v} + 1}{\sqrt{\left(\frac{u_i-u_0}{\alpha_u}\right)^2 + \left(\frac{v_i-v_0}{\alpha_v}\right)^2 + 1}\sqrt{\left(\frac{u_j-u_0}{\alpha_u}\right)^2 + \left(\frac{v_j-v_0}{\alpha_v}\right)^2 + 1}}$$

Thus, the three angles can be calculated from their cosines.

(3) A method of calculating the distance $d_i$ (i=1, 2, 3)

When the second cosine rule is applied to triangles $O_c M_1 M_2$, $O_c M_2 M_3$ and $O_c M_3 M_1$, the following Expression 7 is obtained.

(Expression 7)

$$R_{12} = d_1^2 + d_2^2 - 2d_1 d_2 \cos\theta_{12}$$

$$R_{23} = d_2^2 + d_3^2 - 2d_2 d_3 \cos\theta_{23}$$

$$R_{31} = d_3^2 + d_1^2 - 2d_3 d_1 \cos\theta_{31}$$

In these three expressions, the unknown values are three including $d_1$, $d_2$ and $d_3$, and there are also three constraint expressions. Therefore, theoretically, there exists a solution $\{(d_1(k), d_2(k), d_3(k)): k=1, 2, 3, 4\}$ that satisfies the above expressions.

It has been known that there exist at maximum four possible solutions to the above equations, as explained in detail in the above-described literature 1, and it is possible to obtain the solutions as solutions of a fourth-order polynomial equation based on a numerical analysis. (Refer to the literature 1: M. A. Fischler and R. C. Bolles, "Random sample consensus: A paradigm for model fitting with applications to image analysis and automated cartography," Communications of the ACM, Vol. 24, No. 6, June 1981, pp. 381–395.)

(4) Verification of a solution ($d_1$, $d_2$ and $d_3$) and selection of an optimal solution Basically, only one solution out of maximum four solutions gives a correct solution.

Verifying which one of these solutions gives a correct solution is described in this step.

A method of calculating marker positions ($x_i^c$, $y_i^c$, $z_i^c$) in the camera coordinate system C for each solution ($d_1$, $d_2$ and $d_3$) will be explained.

The distance from the origin C of the camera coordinate system to the marker is $d_i$, and a projected position of the marker in the image is ($u_i$, $v_i$).

Further, ($\tilde{u}_i$, $\tilde{v}_i$, 1) and ($x_i^c$, $y_i^c$, $z_i^c$) are in parallel.

Therefore, the Expression 8 is established.
(Expression 8)

$$d_i = \sqrt{(x_i^c)^2 + (y_i^c)^2 + (z_i^c)^2} \quad D_i = \sqrt{\tilde{u}_i^2 + \tilde{v}_i^2 + 1}$$

It is also possible to express as follows.
(Expression 9)

$$x_i^c = d_i/D_i \tilde{u}_i, y_i^c = d_i/D_i \tilde{v}_i, z_i^c = d_i/D_i$$

It is assumed that the marker position in the object coordinate system is expressed as ($x_i^m$, $y_i^m$, $z_i^m$). Then, the transformation from the object coordinate system $O_m$ to the camera coordinate system $O_c$ is given as follows.
(Expression 10)

$$\begin{bmatrix} x_i^c \\ y_i^c \\ z_i^c \end{bmatrix} = R \begin{bmatrix} x_i^m \\ y_i^m \\ z_i^m \end{bmatrix} + t$$

where R represents the rotation matrix and t represents the translation vector.

It is assumed that the centroid of the markers in both coordinate systems is given as the Expression 11-1.
(Expression 11-1)

$$[x_{mean}^c, y_{mean}^c, z_{mean}^c]^T [x_{mean}^m, y_{mean}^m, z_{mean}^m]^T,$$

Then, the following expression can be obtained.
(Expression 11-2)

$$\begin{bmatrix} x_i^c - x_{mean}^c \\ y_i^c - y_{mean}^c \\ z_i^c - z_{mean}^c \end{bmatrix} = R \begin{bmatrix} x_i^m - x_{mean}^m \\ y_i^m - y_{mean}^m \\ z_i^m - z_{mean}^m \end{bmatrix}$$

$$t = \begin{bmatrix} x_{mean}^c \\ y_{mean}^c \\ z_{mean}^c \end{bmatrix} - R \begin{bmatrix} x_{mean}^m \\ y_{mean}^m \\ z_{mean}^m \end{bmatrix}$$

Thus, it is possible to calculate the translation vector and the rotation vector based on the separate expressions.

One of the methods for solving the above expressions is a quaternion method.

This method is described in detail in the literature 4 (B. K. P. Horn, "Closed-form solution of absolute orientation using unit quaternions, "Journal of Optical Society of America A, Vol. 4, 1987, pp. 629–642). Therefore, the detailed explanation of this method will be omitted here.

When R and t have been calculated in the manner as described above, the homogeneous transformation matrix $_cH_m$ can be calculated by the Expressions 1 and 2.

By repeating the above calculation for four solutions, it is possible to obtain four solutions of $_cH_m$ (1), $_cH_m$ (2), $_cH_m$ (3) and $_cH_m$ (4).

It is assumed that, of the identified code markers, first non-selected code markers are expressed as $M_4$, $M_5$, . . . , $M_n$.

A method of determining a most suitable solution from the homogeneous transformation matrix $_cH_m$ (k) (k=1, 2, 3, 4) by utilizing these $M_4$, $M_5$, . . . , $M_n$ will be explained next.

(1) A value of k that makes minimum an evaluation function dist (k) for each solution $_cH_m$ (k) is calculated in the following steps.

(2) A value of dist (k) for each solution $_cH_m$ (k) (k=1, 2, 3, 4) is calculated in the following method.

a) An evaluation function is initialized as dist (k):=0.

b) For markers $M_j$ (j=4, 5, . . . , m) that have been identified but have not been selected as the first three markers, their three-dimensional positions ($x_j^m$, $y_j^m$, $z_j^m$) in the object coordinate system are transformed into the camera image plane by utilizing $_cH_m$ (k).

A projected image point is expressed as ($u_j'$, $v_j'$). This can be calculated by the following expression.
(Expression 12)

$$\begin{bmatrix} U_j' \\ V_j' \\ W_j' \end{bmatrix} = \begin{bmatrix} \alpha_u & 0 & u_0 & 0 \\ 0 & \alpha_v & v_0 & 0 \\ 0 & 0 & 0 & 0 \end{bmatrix} {}_cH_{m(k)} \begin{bmatrix} x_j^m \\ y_j^m \\ z_j^m \\ 1 \end{bmatrix}$$

$$u_j' = \frac{U_j'}{W_j'} \quad v_j' = \frac{V_j'}{W_j'}$$

Then, the square error $e_j$ of the marker $M_j$ between the two-dimensional position ($u_j$, $v_j$) and the projected image point ($u_j'$, $v_j'$) actually measured in the image, is calculated.

This square error $e_j$ can be calculated as follows.

$$e_j = (u_j' - u_j)^2 + (v_j' - v_j)^2$$

Then, dist (k) can be obtained by the following expression.
(Expression 13)

$$dist(k) = \sum_{j=4}^{m} e_j = \sum_{j=4}^{m} \{(u_j' - u_j)^2 + (v_j' - v_j)^2\}$$

(3) A solution $_cH_m$ (k) of the homogeneous transformation matrix for which the obtained dist (k) becomes minimum is selected.

In summary, an optimal solution $_cH_m$ (k) is obtained in the above-described step in such a way that, among the solutions generated from code markers $M_1$, $M_2$ and $M_3$, a solution which other markers $M_4$, $M_5$, . . . , $M_m$ support most is selected.

(5) Updating of a solution

The solution $_cH_m$ (k) selected in the above-described step (4) has been estimated from the code markers $M_1$, $M_2$ and $M_3$, and estimated values of other markers $M_4$, $M_5$, . . . , $M_m$ are not utilized.

Thus, at the step (5), this solution is updated by all the code markers $M_i$ (i=1, 2, . . . , m), with the solution $_cH_m$ (k) calculated at the step (4) set as an initial estimated value $_cH_m$ (0).

In other words, $_cH_m$ consists of the angle component (roll ($\phi_z$)-pitch ($\phi_y$)-yaw ($\phi_x$)) and the translation component ($t_x$, $t_y$, $t_z$), and a six-dimensional unknown variable is set as $p=(\phi_x, \phi_y, \phi_z; t_x, t_y, t_z)$, with its initial estimated value defined as $p^{(0)}=(\phi_x^{(0)}, \phi_y^{(0)}, \phi_z^{(0)}; t_x^{(0)}, t_y^{(0)}, t_z^{(0)})$.

Specifically, this is defined by the following expression.
(Expression 14)

$$_cH_m = \begin{bmatrix} \cos\phi_z\cos\phi_y & \cos\phi_z\sin\phi_y\sin\phi_x - \sin\phi_z\cos\phi_x & \cos\phi_z\sin\phi_y\cos\phi_x + \sin\phi_z\cos\phi_x & t_x \\ \sin\phi_z\cos\phi_y & \sin\phi_z\sin\phi_y\sin\phi_x + \cos\phi_z\cos\phi_x & \sin\phi_z\sin\phi_y\cos\phi_x - \cos\phi_z\sin\phi_x & t_y \\ -\sin\phi_y & \cos\phi_y\sin\phi_x & \cos\phi_y\cos\phi_x & t_z \\ 0 & 0 & 0 & 1 \end{bmatrix}$$

$$_cH_m^{(0)} = \begin{bmatrix} \cos\phi_z^{(0)}\cos\phi_y^{(0)} & \cos\phi_z^{(0)}\sin\phi_y^{(0)}\sin\phi_x^{(0)} - \sin\phi_z^{(0)}\cos\phi_x^{(0)} & \cos\phi_z^{(0)}\sin\phi_y^{(0)}\cos\phi_x^{(0)} + \sin\phi_z^{(0)}\cos\phi_x^{(0)} & t_x^{(0)} \\ \sin\phi_z^{(0)}\cos\phi_y^{(0)} & \sin\phi_z^{(0)}\sin\phi_y^{(0)}\sin\phi_x^{(0)} + \cos\phi_z^{(0)}\cos\phi_x^{(0)} & \sin\phi_z^{(0)}\sin\phi_y^{(0)}\cos\phi_x^{(0)} - \cos\phi_z^{(0)}\sin\phi_x^{(0)} & t_y^{(0)} \\ -\sin\phi_y^{(0)} & \cos\phi_y^{(0)}\sin\phi_x^{(0)} & \cos\phi_y^{(0)}\cos\phi_x^{(0)} & t_z^{(0)} \\ 0 & 0 & 0 & 1 \end{bmatrix}$$

Next, there will be considered an updating of the six-dimensional pose parameter $p=(\phi_x, \phi_y, \phi_z; t_x, t_y, t_z)$ by utilizing a relationship between the marker three-dimensional position $(x_i^m, y_i^m, z_i^m)$ in the object coordinate system and the position $(u_i, v_j)$ on the camera image plane.

The relationship between the three-dimensional marker position $(x_i^m, y_i^m, z_i^m)$ in the object coordinate system and the position $(u_i, v_j)$ on the camera image plane is given by the following expression.
(Expression 15)

$$\begin{bmatrix} U_i \\ V_i \\ W_i \end{bmatrix} = \begin{bmatrix} \alpha_u & 0 & u_0 & 0 \\ 0 & \alpha_v & v_0 & 0 \\ 0 & 0 & 0 & 0 \end{bmatrix} {_cH_m} \begin{bmatrix} x_i^m \\ y_i^m \\ z_i^m \\ 1 \end{bmatrix}$$

$$u_i = \frac{U_i}{W_i} \quad v_i = \frac{V_i}{W_i}$$

When this expression is rearranged, each marker $M_i$ (i=1, 2, ..., m) is expressed by a two-dimensional constraint equation as follows:
(Expression 16)

$$f_i(p; x_i^m, y_i^m, z_i^m; u_i, v_i) = \begin{bmatrix} f_i^1(p; x_i^m, y_i^m, z_i^m; u_i, v_i) \\ f_i^2(p; x_i^m, y_i^m, z_i^m; u_i, v_i) \end{bmatrix} = 0$$

This becomes a subject of estimating the six-dimensional parameter $p=(\phi_x, \phi_y, \phi_z; t_x, t_y, t_z)$ by utilizing the initial estimated value $p^{(0)}=(\phi_x^{(0)}, \phi_y^{(0)}, \phi_z^{(0)}; t_x^{(0)}, t_y^{(0)}, t_z^{(0)})$ of the six-dimensional parameter.

This is a subject of a well-known nonlinear equation, and this method is introduced in many literatures. Accordingly, details of this method will not described here.

As explained above, the six-dimensional parameter is updated by utilizing estimated values of all the markers, and the coordinate transformation parameter for transforming from the object coordinate system to the camera coordinate system is calculated.

In other words, it is possible to calculate a positional relationship between the object 1 and the image acquisition apparatus 3.

According to the above-described first embodiment, it is possible to calculate a three-dimensional positional relationship between the object 1 and the image acquisition apparatus 3 from only the detected markers, even if part of the markers has not been detected due to occlusion.

Further, in detecting the markers, the method according to the first embodiment makes it possible to substantially improve the reliability of marker identification, by utilizing unique codes of the markers, as compared with the prior-art technique. Therefore, it is possible to achieve a more stable measuring of a position and orientation.

(Second Embodiment)

Next, a second embodiment of the invention will be explained below.

In the first embodiment explained above, it has been assumed that the image acquisition apparatus 3 that can generate a color image is used and that a marker region can be extracted by using this color information.

On the other hand, according to the second embodiment, it is assumed that the image acquisition apparatus 3 acquires a monochrome image instead of a color image and that a marker region is identified by extracting a unique geometric structure of the marker from the image.

Further, according to the second embodiment, by utilizing the information on the size of an extracted marker region, an initial estimate value of the distance from the camera coordinate system to the maker is calculated. This makes it possible to calculate in a stable condition a parameter of a three-dimensional position and orientation relationship between the object 1 and the image acquisition apparatus 3, even if the number of markers is three.

According to the system of utilizing a color image as explained in the first embodiment, there are many cases where it is difficult to accurately extract a region corresponding to a maker because of an extraction of a single-color region or because of a simple processing of a threshold value, when illumination changes under a complex environment.

On the other hand, according to the system explained in the second embodiment, it is possible to extract a unique geometric relationship of a marker from the image in such a manner that it is possible to estimate the three-dimensional position and orientation in a robust manner even under such a complex environment.

The basic structure of the present embodiment is similar to that as shown in FIG. 1. The processing method of this embodiment is also similar to that as shown in FIG. 6. At the step 1, the image acquisition apparatus 3 transmits a monochromatic image to the computer 4 instead of a color image.

At the step 2, a marker region is extracted from the monochromatic image instead of a color image, which is different from the first embodiment.

At the step 3, a code necessary for identifying a marker is extracted from the marker region, and the information on the size of the marker region itself is extracted. This point is different from the first embodiment.

Further at the step 4, the three-dimensional position and orientation parameter for the relationship between the object to be measured 1 and the image acquisition apparatus 3 is calculated, by also utilizing the information on the size of the marker region.

A detailed procedure of the steps 2, 3 and 4 will be explained below.

In the present embodiment, a circular marker as shown in FIG. 3 will be explained as the code marker.

Figure 9:
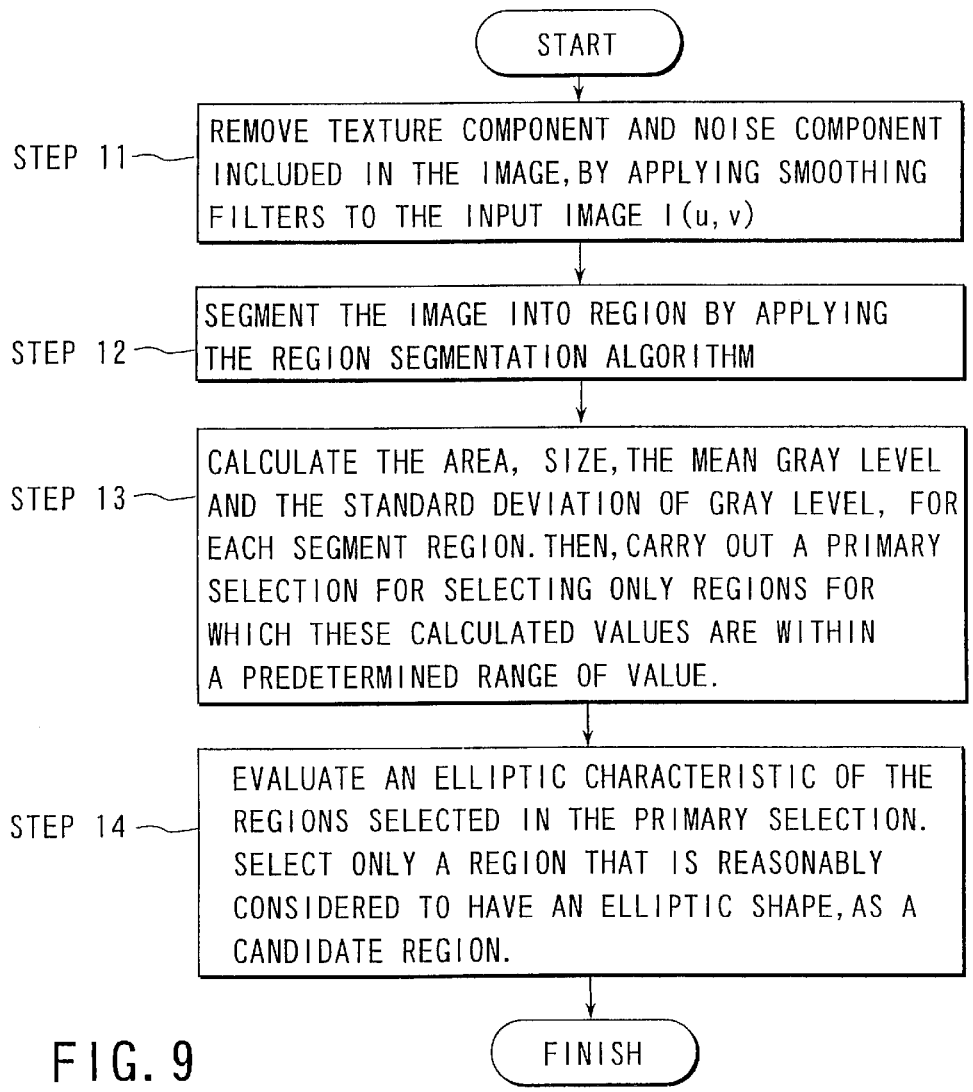
FIG. 9 is a flowchart for showing a processing procedure at step 2 according to a second embodiment of the invention.

Step 2:

FIG. 9 is a flowchart for showing a procedure of the processing at the step 2 in the second embodiment.

At step 11, a monochromatic image transmitted from the image acquisition apparatus 3 is stored in the memory area within the computer 4. Then, smoothing filters such as median filters are applied to an image array I (u, v), thereby to remove fine textures existing in the marker region and noise components included in the image.

Then, at step 12, a region-based segmentation algorithm is applied to the smoothed region, thereby to segment the image into regions.

As this region-based segmentation algorithm, there may be used a Spedge-and-Medge method shown in the above-describe literature 3 (K. Rahardja and A. Kosaka "Vision-based bin-picking: Recognition and localization of multiple complex objects using simple visual cues, "Proceedings of 1996 IEEE/RSJ International Conference on Intelligent Robots and Systems, Osaka, Japan, November 1996). It is also possible to use a Split-and-Merge method shown in the literature 5 (T. Pavlidis and Y. Liow, "Integrating region growing and edge detection, "IEEE Transactions on Pattern Analysis and Machine Intelligence, Vol. 12, No. 3, pp. 225–233, 1990). Further, it is also possible to use a method for segmenting an image by connecting edge components extracted by the Canny's edge extraction method.

Next, at step 13, geometric and non-geometric parameters are calculated for each region segmented as follows.

For example, "area A (k)", "size L (k)", "mean value of gray level m (k)", "standard deviation of gray level s (k)", etc. are calculated for the area k.

A decision is made as to whether or not each region parameter is a reasonable value that can be taken as a marker, based on a threshold value processing.

More specifically, a decision is made as to whether or not region parameter is within a predetermined range of value.

For example, when each region parameter is area A (k), size L (k), mean value of gray level m (k), or standard deviation of gray level s (k), whether all of the following Expression 17 is met or not is made a decision condition.
(Expression 17)

$A_{min} < A(k) < A_{max}$ $L_{min} < L(k) < L_{max}$ $m_{min} < m(k) < m_{max}$ $s_{min} < s(k) < s_{max}$ In this case, values of $A_{min}$ and $A_{max}$ can be set in advance by considering the size and color of the object 1, the size of the code marker 2, and an upper limit and a lower limit of the distance between the image acquisition apparatus 3 and the object 1.

A primary candidate of a region that is considered to correspond to the marker is selected from the regions that are segmented in this way.

Next, at step 14, a decision is made through a detailed procedure as to whether or not the candidate region selected in the primary selection is considered reasonable as the code marker region.

In this case, basically, the boundary shape of the code marker is circular as shown in FIG. 3. Therefore, it is possible to approximate a projected image in the image by an ellipse.

Thus, a decision is made in detail as to whether or not the area selected as a candidate in the primary selection has an elliptic shape.

This decision method is similar to that of the first embodiment, and therefore, the explanation of this method will be omitted here.

Thus, the step 2 is finished.

Step 3:

At the step 3, the only difference from the first embodiment is that the original image is a monochromatic image instead of a color image. As the processing method at this step is the same as that of the first embodiment, the explanation of this method will be omitted here.

Step 4:

After the code marker has been identified at the step 3, the information used at the step 4 for each code marker is the three-dimensional position $(x_i^m, y_i^m, z_i^m)$ of the code marker with respect to the object coordinate system, the position $(u_i, v_i)$ on the camera image plane, and the length $r_i$ of the long axis of the code marker in the image based on the approximation of the ellipse.

At the step 4, a description will be made of a method of calculating an initial estimate value of the distance $d_i$ from the camera coordinate system to each code marker by utilizing the length $r_i$ of the long axis of the code marker in the image based on the approximation of the ellipse, and a method of measuring a three-dimensional positional relationship between the object 1 and the image acquisition apparatus 3 by effectively utilizing this initial estimate value.

(1) Calculation of an initial estimate value of a distance from the image acquisition apparatus 3 to the marker 2

When the marker has been identified as described above, an initial estimate value of the distance between the marker 2 and the image acquisition apparatus 3 is calculated.

This method will be explained below.

As shown in FIG. 10, the center of the marker is expressed as $P_i$, the focal point of the camera is expressed as $O_c$, and the intersection point between the camera image plane and $O_c P_i$ is expressed as $Q_i$. Then, it can be decided that $Q_i$ is the center of the marker image.

Further, a three-dimensional model of the marker is approximated by a sphere having radius $R_i$, and the image of the marker is approximated by an ellipse. The length of the long axis of the ellipse within the image is expressed as $r_i$.

There is a relationship of the Expression 18-1 between the image point $(u_i, v_i)$ and the normalized image point $(\tilde{u}_i, \tilde{v}_i)$.

(Expression 18-1)

$$\tilde{u}_i = \frac{u_i - u_0}{\alpha_u}, \tilde{v}_i = \frac{v_i - v_0}{\alpha_v}$$

In this case, a relationship of $\alpha_u \approx \alpha_v$ exists in the actual camera system.

Thus, these values are approximated by the Expression 18-2.
(Expression 18-2)

$$\alpha_{uv} = \frac{1}{2}(\alpha_u + \alpha_v)$$

Then, the length $\tilde{r}_i$ of the long axis of the ellipse in the normalized camera image plane is expressed by the Expression 18-3.
(Expression 18-3)

$$\tilde{r}_i = \frac{1}{\alpha_{uv}} r_i$$

Between the long axis of the normalized ellipse and the marker sphere, there is an approximate relationship as follows.
(Expression 18-4)

$$\frac{R_i}{\cos\theta_i} : \tilde{r}_i = \tilde{z}_i : 1$$

where $\theta_i$ represents the angle formed by the optic axis of the camera and $OP_i$, and $z_i$ represents the z-value of $P_i$ in the camera coordinate system.

Further, the following relationship is established between $z_i$ and $d_i$.
(Expression 19-1)

$$z_i = d_i \cos\theta_i$$

Therefore, $d_i$ can be expressed as follows.
(Expression 19-2)

$$d_i = \frac{R_i}{\tilde{r}_i \cos^2\theta_i}$$

This can then be expressed as follows.
(Expression 19-3)

$$d_i = \frac{\alpha_{uv} R_i}{r_i \cos^2\theta_i}$$

When there is an estimation an error of $\delta r_i$ in the measurement of $r_i$, the error $\delta d_i$ of $d_i$ can be expressed as follows.
(Expression 19-4)

$$\delta d_i = -\frac{\alpha_{uv} R_i}{r_i^2 \cos^2\theta_i} \delta r_i$$

Accordingly, the error variance $\sigma d_i^2$ of $d_i$ can be expressed as follows by utilizing the error variance $\sigma r_i^2$.
(Expression 19-5)

$$\sigma d_i^2 = \left(\frac{\alpha_{uv} R_i}{r_i^2 \cos^2\theta_i}\right)^2 \sigma r_i^2$$

(2) Estimation of the three-dimensional position and orientation of the object 1 with respect to the image acquisition apparatus 3

A method of calculating the marker position $(x_i^c, y_i^c, z_i^c)$ in the camera coordinate system $O_c$ will be explained first. Then, a method of calculating a coordinate transformation parameter for transformation between the object coordinate system and the camera coordinate system will be explained.

For each of marker i and marker j, the three-dimensional distance is expressed as $R_{ij}$, and the angle formed by a camera viewpoint $O_c$ (focal point) and $Q_i$, $Q_j$ is expressed as $\theta_{ij}$. Then, the normalized image point $(\tilde{u}_i, \tilde{v}_i)$ corresponds to $(x_c, y_c)$ corresponding to the camera coordinate system $z_c = 1$, and the angle formed by the vectors $(\tilde{u}_i, \tilde{v}_i, 1)$ and $(\tilde{u}_j, \tilde{v}_j, 1)$ is $\theta_{ij}$. Therefore, the following relationship is given.
(Expression 20)

$$\cos\theta_{ij} = \frac{\tilde{u}_i \tilde{u}_j + \tilde{v}_i \tilde{v}_j + 1}{\sqrt{\tilde{u}_i^2 + \tilde{v}_i^2 + 1} \sqrt{\tilde{u}_j^2 + \tilde{v}_j^2 + 1}}$$

$$= \frac{\frac{u_i - u_0}{\alpha_u} \frac{u_j - u_0}{\alpha_u} + \frac{v_i - v_0}{\alpha_v} \frac{v_j - v_0}{\alpha_v} + 1}{\sqrt{\left(\frac{u_i - u_0}{\alpha_u}\right)^2 + \left(\frac{v_i - v_0}{\alpha_v}\right)^2 + 1} \sqrt{\left(\frac{u_j - u_0}{\alpha_u}\right)^2 + \left(\frac{v_j - v_0}{\alpha_v}\right)^2 + 1}}$$

As the three-dimensional position of each marker in the reference coordinate system is determined, the distance between the markers is also determined.

When this distance is expressed as $R_{ij}$, the following expression must be satisfied from the cosine rule of triangle.
(Expression 21)

$$f_{ji} = d_i^2 + d_j^2 - 2 d_i d_j \cos\theta_{ij} - R_{ij}^2 = 0$$

Therefore, it is possible to update the initial estimate of $d_i$ by utilizing the estimated value of $d_i$ and the error variance of $d_i$ obtained at the preceding step, and the error variance of $\cos(\theta_{ij})$ p For calculating the initial value of $d_i$, there are many methods such as, for example, (1) a method of utilizing the Newton method,
(2) a method of utilizing a quasi-Newton method,
(3) a method of utilizing the Kalman filter.

In the present embodiment, a method of calculating a solution by utilizing the Kalman filter in (3) above will be described.

A vector p with the distance $d_i$ (i=1, 2, ..., n) as a variable is defined, and an initial covariance matrix of this vector is expressed as S. In other words, the following expression is assumed.
(Expression 22-1)

$$p = [d_1, d_2, \ldots d_n]^T, \quad S = \text{diag}(\sigma_1^2, \sigma_2^2, \ldots, \sigma_n^2),$$

In this case, a differential equation as given by the Expression 22-3 is considered by using the Expression 22-2 as a measurement vector.
(Expression 22-2)

$$q_{ij} = [u_i, v_i, u_j, v_j]^T$$

(Expression 22-3)

$$\frac{\partial f_{ij}}{\partial p} = \left[0 \ldots 0 \overset{i}{\frac{\partial f_{ij}}{\partial d_i}} 0 \ldots 0 \overset{j}{\frac{\partial f_{ij}}{\partial d_j}} 0 \ldots 0\right]$$

In this case, the Expression 22-4 is given.
(Expression 22-4)

$$\frac{\partial f_{ij}}{\partial d_i} = 2d_i - 2d_j \cos\theta_{ij}, \quad \frac{\partial f_{ij}}{\partial d_j} = 2d_j - 2d_i \cos\theta_{ij}$$

Also the Expression 22-5 is given.
(Expression 22-5)

$$\frac{\partial f_{ij}}{\partial q_{ij}} = \left[-2d_i d_j \frac{\partial \cos\theta_{ij}}{\partial u_i} - 2d_i d_j \frac{\partial \cos\theta_{ij}}{\partial v_i} - 2d_i d_j \frac{\partial \cos\theta_{ij}}{\partial u_j} - 2d_i d_j \frac{\partial \cos\theta_{ij}}{\partial v_j}\right]$$

The Expression 22-6 and Expression 22-7 are also given.
(Expression 22-6)

$$h_i = \sqrt{(\tilde{u}_i)^2 + (\tilde{v}_i)^2} \quad h_j = \sqrt{(\tilde{u}_j)^2 + (\tilde{v}_j)^2}$$

$$s_{ij} = \tilde{u}_i\tilde{u}_j + \tilde{v}_i\tilde{v}_j \cos\theta_{ij} \frac{s_{ij}}{h_i h_j}$$

(Expression 22-7)

$$\frac{\partial \cos\theta_{ij}}{\partial q_{ij}} = \left[ \alpha_u \frac{\tilde{u}_j h_i h_j - \frac{\tilde{u}_i h_j}{h_i}}{h_i^2 h_j^2} \right.$$

$$\left. \alpha_v \frac{\tilde{v}_j h_i h_j - \frac{\tilde{v}_i h_j}{h_i^2 h_j^2}}{h_i^2 h_j^2} \alpha_u \frac{\tilde{u}_i h_i h_j - \frac{\tilde{u}_j h_i}{h_j}}{h_i^2 h_j^2} \alpha_v \frac{\tilde{v}_i h_i h_j - \frac{\tilde{v}_j h_i}{h_j}}{h_i^2 h_j^2} \right]$$

Then, the structure of the Kalman filter requires the initial estimates expressed by Expression 22-8.
(Expression 22-8)

$$p = [d_1, d_2, \ldots, d_n]^T, S = \mathrm{diag}(\sigma_1^2, \sigma_2^2, \ldots, \sigma_n^2)$$

$$\Lambda = \mathrm{diag}(\sigma_u^2, \sigma_v^2, \sigma_u^2, \sigma_v^2)$$

The estimates are updated by carrying out the iterations of the Kalman filtering as expressed by the Expression 22-9.
(Expression 22-9)

$$\text{for}(i = 0; i < n; i++)\{$$
$$\quad \text{for}(j = i+1; j < n; j++)\{$$
$$\quad\quad \tilde{u}_i = \frac{u_i - u_0}{\alpha_u} \quad \tilde{v}_i = \frac{v_i - v_0}{\alpha_v}$$
$$\quad\quad M = \frac{\partial f_{ij}}{\partial p} =$$
$$\quad\quad \frac{\partial f_{ij}}{\partial q_{ij}} =$$
$$\quad\quad \left[ -2d_i d_j \frac{\partial \cos\theta_{ij}}{\partial u_i} - 2d_i d_j \frac{\partial \cos\theta_{ij}}{\partial v_i} - \right.$$
$$\quad\quad \left. 2d_i d_j \frac{\partial \cos\theta_{ij}}{\partial u_j} - 2d_i d_j \frac{\partial \cos\theta_{ij}}{\partial v_j} \right]$$
$$\quad\quad U = \left(\frac{\partial f_i}{\partial q_{ij}}\right) \Lambda \left(\frac{\partial f_{ij}}{\partial q_{ij}}\right)^T$$
$$\quad\quad K = SM^T(U + MSM^T)^{-1}$$
$$\quad\quad p_{new} = p - K f_{ij}$$
$$\quad\quad S_{new} = (I - KM)S$$
$$\quad\quad p = p_{new} \quad s = s_{new}$$
$$\quad \}$$
$$\}$$

Thus, it is possible to update the vector p to be obtained.

This vector p corresponds to the distances from the origin of the camera coordinate system to marker positions.

When there distances have been estimated, it is possible to calculate the coordinate transformation parameter for transforming from the object coordinate system to the camera coordinate system, in a similar manner to that as explained in the first embodiment.

As explained above, according to the second embodiment, it is not necessary to use a color image as an original image. Accordingly, it is possible to structure a lower-cost system. It is also possible to measure the three-dimensional positional relationship between the object and the image acquisition apparatus even in the case of using at least three code markers.

(Third Embodiment)

Next, a third embodiment of the invention will be explained.

In the first and second embodiments, an image having the same size as that of the original image is utilized in order to extract regions that are considered to be marker regions from the original image.

However, in the present invention, basically, a region corresponding to a marker has a simple shape like a circle or a polygon, and the internal background of the region is structured by a uniform color. Therefore, according to the present invention, it is possible to extract regions that are considered to be marker regions, without processing an image having the same size as that of the original image.

Thus, in the present embodiment, there will be explained a method for reducing a processing time I relating to the extraction of marker regions in the original image size. According to this method, the size of the original image is once reduced. From the shrunk image, marker regions are extracted in the manner as described in the first or second embodiment. By utilizing the positions of the markers extracted from the shrunk image, the positions of the marker region in the original image are estimated. Further, code markers are identified within the marker regions of the original image size.

In the present embodiment, a description will be made of the case where an image is processed by reducing the size of the image, based on the method explained in the second embodiment.

However, it is needless to mention that this processing can also be easily applied to the method as explained in the first embodiment.

In the present embodiment, there will be explained a processing of an image of which size has been reduced to one sixteenth of the size of the original image.

Basically, the method is to extract marker regions at the step 1 in FIG. 6, based on the shrunk image.

Sub-step 1:

The size of the original image is reduced to one sixteenth (that is, the length of the original image in the row direction is reduced to a quarter, and the length of the image in the column direction is reduced to a quarter).

It is assumed that the image array of the original image is expressed as (i, j) and the image layout of the shrunk image is expressed as (is, js). In this case, a contracted image is generated by setting the average gray value of sixteen pixels to the pixel value of (is, js), where i and j are expressed as i=4*is+0, i=4*is+1, i4*is+2, i=4*is+3 and j=4*js+0, j=4*js+1, j=4*js+2, j=4*js+3.

Sub-step 2:

For the shrunk image generated at the sub-step 1, the regions that are considered to correspond to markers are extracted.

This extraction method is similar to that as described in the first embodiment or the second embodiment.

Sub-step 3:

By multiplying the positional coordinates (is, js) of the region extracted at the sub-step 2 by four, a marker region in the original image is estimated.

Based on the method as explained in the third embodiment, it is possible to extract regions that are considered to be markers by processing the shrunk image having a size of one sixteenth of that of the original image. Thus, it is possible to increase the speed of processing the whole process.

(Fourth Embodiment)

Next, a fourth embodiment of the invention will be explained.

In the fourth embodiment, a description will be made of a method for improving the precision of estimating the position and orientation by utilizing landmark points other than code markers.

In the first to third embodiments, there have been explained the methods for estimating the three-dimensional position and orientation of an object defined by code markers and the image acquisition apparatus, by utilizing only the relationship between a three-dimensional positional model of markers called code markers and two-dimensional positions of code markers in the projected image.

These methods are acceptable when it is possible to utilize a large number of code markers or when the precision of measurement is not so necessary.

However, when a high-precision estimating of a position and orientation is required, more constraints over the three-dimensional model of a larger number of markers and the measurements image points in the image is necessary.

In the method of the fourth embodiment described below, model features other than code markers are used, and the estimation of the position and orientation is achieved with a higher precision by increasing the number of constraints between the model features and measured image features.

These model features will be called landmarks. How to extract these landmarks from the image and how to estimate the position and orientation of the object 1 by utilizing this extracted landmarks will be explained below based on various examples.

EXAMPLE 1

At first, as a first example, there will be explained below a method for estimating the position and orientation of an object by utilizing constraints over model features and image features. In this case, as the model features other than code marker positions, positions of the model features in an image other than the code marker positions are estimated by utilizing the positions of adjacent code markers recognized in advance. Then, image features in the neighborhood of the estimated positions of the model features are extracted.

It is assumed that code markers 0, 1, . . . , m−1 are expressed by positional vectors $p_0, p_1, \ldots p_{m-1}$, in the object coordinate system. Further, it is assumed that positional vector $p_k$ of a landmark k is expressed by a linear combination of $p_0, p_1, \ldots p_{m-1}$. Then, in this case, the positional vector $p_k$ can be estimated by the Expression 23 by utilizing $(b_0, b_1, \ldots, b_{m-1})$.

(Expression 23)

$$p_k = \beta_0 p_0 + \beta_1 p_1 + \ldots + \beta_{m-1} p_{m-1}$$

Then, position $q_k=(u_k, v_k)$ in this image can be estimated by the Expression 24, utilizing measured image positions of code markers $q_0=(u_0, v_0)$, $q_1=(u_1, v_1)$, and $q_{m-1}=(u_{m-1}, v_{m-1})$.

(Expression 24)

$$q_k = \beta_0 q_0 + \beta_1 q_1 + \ldots + \beta_{m-1} q_{m-1}$$

By utilizing this estimated value, a landmark that is considered to be a most likely landmark in the vicinity of $q_k$ is extracted from the image.

FIG. 11 illustrates one example of extracting a landmark from the image. In this case, the example as illustrated in FIG. 11 will be considered.

In this example, it is assumed that code marks 0, 1 and 2 have already been extracted in advance. A case is considered where a landmark of a circular shape is disposed at the centroid of the three code markers.

Then, it is possible to extract the landmark k, by taking the steps of finding centroid of the code markers 0, 1 and 2 extracted from the image, setting a window of a suitable size in the vicinity of this centroid, and then extracting a circular region from this window region based on a threshold value method.

When the region corresponding to the landmark k has been extracted in this way, the centroid of this region is registered as the position of the landmark k.

As explained above, when the code markers and landmarks have been extracted and when positions in the image have been calculated, it is possible to estimate the position and orientation of the object 1 based on the position estimating method as described in the first embodiment.

As an alternative method, it is possible to estimate the position and orientation of the object 1 as follows. At first, the position and orientation of the object is estimated by utilizing code markers, and then an initial estimate of the position and orientation of the object 1 is obtained by calculation, based on a method as explained in the second embodiment. Next, the estimated value of the position and orientation of the object 1 is updated by utilizing measured image positions the landmarks and their positions in the object coordinate system, based on a method as explained in the method of updating a solution in the first embodiment.

EXAMPLE 2

In a method of a second example explained below, at first, an initial estimate of the three-dimensional position and orientation of the object 1 is calculated by utilizing code markers extracted in advance. Then, by utilizing this initial estimate, an estimate of the predicted position of the landmark within the image is calculated. Finally, the landmark is searched in the vicinity of this predicted position.

When the landmark has been identified, the estimate of the three-dimensional position and orientation of the object 1 is updated, by utilizing the three-dimensional position of the landmark in the object coordinate system and the two-dimensional position of the landmark in the image.

This method will be explained below.

It is assumed that code markers 0, 1, . . . , m−1 have been identified in the image. Then, it is possible to estimate a three-dimensional position and orientation of the object 1 by utilizing the three-dimensional positional coordinates of these code markers in the object coordinate system and the two-dimensional coordinates of the code markers measured in the image.

This method is similar to that as explained in the first embodiment or the second embodiment.

It is now assumed that an initial estimate of this three-dimensional position and orientation is $_cH_m$.

It is also assumed that the position of a landmark k in the object coordinate system is $(x_k, y_k, z_k)$. Then, an estimate value $(u_k, v_k)$ of the land k in the image can be calculated based on the Expressions 3 and 4.

In the vicinity of this estimate $(u_k, v_k)$, it is possible to extract and identify the landmark from the image.

When each landmark has been extracted and identified in this way, it is possible to update the estimate of the three-dimensional position and orientation of the object 1 in a manner similar to that as explained in the second embodiment.

By utilizing the method as described above, it becomes possible to estimate the three-dimensional position and orientation of an object by utilizing landmarks other than code markers. Thus, it is possible to achieve an accurate estimation of the position and orientation in a more robust manner.

In this method, it is also possible to reduce the number of code markers to be registered in advance.

(Fifth Embodiment)

In the fifth embodiment of the invention, there will be explained a method of estimating the three-dimensional position and orientation of an object with respect to an apparatus other than the image acquisition apparatus.

In the first to fourth embodiments of the invention explained above, there have been described the methods of estimating a positional relationship between the object 1 and the image acquisition apparatus 3.

However, as a more practical example, there is a case where the image acquisition apparatus 3 and the computer 4 shown in FIG. 1 are utilized as positional sensors for estimating the position and orientation of the object 1 in a certain system.

In this case, it is more general to consider that there is a separate apparatus within a system that includes a positional sensor consisting of the image acquisition apparatus 3 and the computer 4, and that a coordinate system defined by this separate apparatus becomes the reference coordinate system.

FIG. 12 is a block diagram for illustrating a structure of the concept of the fifth embodiment.

As shown in FIG. 12, an image acquisition apparatus 123 for acquiring an image of an object 121 mounted with code markers 122 transmits image data to a computer 124 that is a data processing unit. The computer 124 analyzes this image data, and calculates the coordinate transformation parameter for transforming from an object coordinate system defined by the object 121 to the camera coordinate system defined by the image acquisition apparatus 123.

On the other hand, the computer 124 stores in advance the coordinate transformation parameter for transforming from the camera coordinate system defined by the image acquisition apparatus 123 to the reference coordinate system defined by an apparatus 125 that defines this reference coordinate system.

By utilizing this coordinate transformation parameter, the computer 124 calculates a coordinate transformation parameter for transforming from the object coordinate system to the reference coordinate system.

It is now assumed that the image acquisition apparatus 123 has been calibrated to the apparatus 125 that defines the reference coordinate system.

More specifically, it is assumed that a relationship between the camera coordinate system Oc defined by the image acquisition apparatus 123 and the reference coordinate system Or has been determined in advance by the homogeneous transformation matrix $_rH_c$ (a homogeneous transformation matrix from the camera coordinate system to the reference coordinate system).

When it is assumed that the computer 124 has identified the markers from the image and has estimated the three-dimensional position and orientation of the object 121 in the camera coordinate system, it is possible to calculate the coordinate transformation parameter from the object coordinate system to the camera coordinate system. This can be expressed by $_cH_m$.

From these two homogeneous transformation matrices, it is possible to calculate the homogeneous transformation matrix from the object coordinate system to the reference coordinate system, as follows.

(Expression 25)

$$_rH_m = {_rH_c} {_cH_m}$$

Thus, it is possible to estimate the three-dimensional position and orientation of the object 121 in the reference coordinate system.

As can be understood from the fifth embodiment, it is also possible to utilize the present invention as a position and orientation sensor for other apparatus.

From the above, it is possible to estimate the three-dimensional position and orientation of the object 121 in the reference coordinate system.

As is clear from the fifth embodiment, it is also possible to utilize the present invention as a position and orientation sensor for other apparatus.

(Sixth Embodiment)

In the sixth embodiment, a description will be made of a case where the present invention is applied as a sensor probe (a wireless sensor probe).

In recent years, there have been widely developed sensor probes for measuring a three-dimensional point of a three-dimensional object.

For this purpose, there is a method that utilizes an optical sensor such as Flash Point, or a method that utilizes a magnetic sensor, or the like.

In the case of the method utilizing an optical sensor using a light-emitting diode such as Flash Point, it is possible to measure in high precision. However, this method has an operational problem in which it is necessary to connect between a sensor probe and an apparatus with a wire.

On the other hand, in the case of the method utilizing a magnetic sensor, it is possible to carry out a wireless measurement. However, this method has a problem in which the magnetic sensor is badly affected by noise when there is a metal tool or the like around this sensor.

The present embodiment is applied to a sensor probe operated in wireless that has been invented in order to solve the above-described problems and that is not affected by electromagnetic waves.

More specifically, code markers as explained in the first embodiment or the second embodiment are mounted on the sensor probe itself. Then, the position and orientation from the image acquisition apparatus to the sensor probe is estimated, and the position probed by the sensor probe is estimated.

An example of a case where this sensor probe is applied will be explained in detail.

FIG. 13 is a block diagram for illustrating a structure according to the sixth embodiment.

As shown in FIG. 13, an object X139 to be probed is probed by a sensor probe 138.

This sensor probe 138 is mounted with code markers (2, 122) as explained in the preceding embodiments. An image acquisition apparatus 133 acquires an image including these code markers.

Image data of the image including the code markers acquired by the image acquisition apparatus 133 is transmitted to a computer 134.

The computer 134 analyzes the image based on the image data transmitted from the image acquisition apparatus 133, and measures at first the position and orientation parameter of the sensor probe 138 with respect to the image acquisition apparatus 133.

In this case, the coordinate system on which the sensor probe 138 is to be based is defined by an apparatus 136, connected to the computer 134, that defines the reference coordinate system. The computer 134 transmits three-dimensional positional data 137 of a probe that coincides with the reference coordinate system, to the apparatus 136 that defines the reference coordinate system.

FIG. 14A and FIG. 14B are views for illustrating an example of the sensor probe 138.

In FIG. 14A and FIG. 14B, the sensor probe has a needle for probing at its tip or front end. The tip of the probe is defined as the origin of the object coordinate system as described in the first embodiment or the second embodiment.

Based on this origin, three axes of $X_m$ axis, $Y_m$ axis and $Z_m$ axis are defined for defining the object coordinate system.

Further, this sensor probe is mounted with a plurality of code markers as explained in the first embodiment and the second embodiment.

It is assumed that the positions of these code markers are determined in advance on the object coordinate system, and the three-dimensional coordinate system of each code marker is expressed as $(x_i^m, y_i^m, z_i^m)$ In this case, an image of these code markers are acquired by the image acquisition apparatus 133. The image including these code markers is analyzed by the computer 134. Thus, it is possible to calculate a coordinate transformation parameter for transforming from the object coordinate system to the camera coordinate system defined by the image acquisition apparatus 133.

In other words, it is possible to calculate the homogeneous transformation matrix for transforming from the object coordinate system to the camera coordinate system defined by the image acquisition apparatus 133. In other words, it is possible to calculate $_cH_m$ given by the following expression.

(Expression 26)

$$\begin{bmatrix} x_i^c \\ y_i^c \\ z_i^c \\ 1 \end{bmatrix} = {_cH_m} \begin{bmatrix} x_i^m \\ y_i^m \\ z_i^m \\ 1 \end{bmatrix} = \begin{bmatrix} R & t \\ 0 & 1 \end{bmatrix} \begin{bmatrix} x_i^m \\ y_i^m \\ z_i^m \\ 1 \end{bmatrix}$$

As the tip of the sensor probe 138 coincides with the origin of the object coordinate system, $(x_im, y_i^m, z_i^m)=(0, 0, 0)$ is substituted in the expression. Then, it is possible to calculate the three-dimensional position of the tip in the camera coordinate system.

The value becomes the translation vector t itself.

It is now considered a case where the image acquisition apparatus 133 has been calibrated in the reference coordinate system R.

In other words, it is considered a case where the image acquisition apparatus 133 has been defined in the coordinate system of other apparatus 136, as shown in FIG. 13.

In this case, it can be considered that the homogeneous transformation matrix $_rH_c$ from the image acquisition apparatus 133 to the reference coordinate system has been calibrated in advance.

Accordingly, the three-dimensional coordinate $(x_i^r, y_i^r, z_i^r)$ of the tip of the sensor probe 138 in the reference coordinate system can be expressed by the following expression.

(Expression 27)

$$\begin{bmatrix} x_i^r \\ y_i^r \\ z_i^r \\ 1 \end{bmatrix} = {_rH_c} \begin{bmatrix} x_i^c \\ y_i^c \\ z_i^c \\ 1 \end{bmatrix} = {_rH_{cc}H_m} \begin{bmatrix} 0 \\ 0 \\ 0 \\ 1 \end{bmatrix}$$

Thus, the sensor probe can provide a three-dimensional position of the probe point in the reference coordinate system.

Therefore, according to the present embodiment, it is possible to realize a wireless sensor probe that cannot be obtained by the prior-art technique.

(Seventh Embodiment)

In the seventh embodiment of the invention, there will be explained a case of utilizing a stereo camera.

The embodiments that have been explained above are for the case of measuring a positional relationship between the object and the image acquisition apparatus by using one image on one frame acquired by the image acquisition apparatus.

However, in the present embodiment, there will be explained a case where there are prepared a plurality of image acquisition apparatuses, and the positional relationship between each of these apparatuses and the object is measured.

According to the present system, it is possible to estimate the position and orientation in a stable manner even if there are three code markers that are to be detected.

Basically, in the present embodiment, a description will be made of the case where the image acquisition apparatuses have been calibrated in advance (that is, a relative position between the image acquisition apparatuses has been determined).

A case of having only two image apparatuses will be explained here. However, it is easy to expand the number of image acquisition apparatuses to a number exceeding two.

Figure 15:
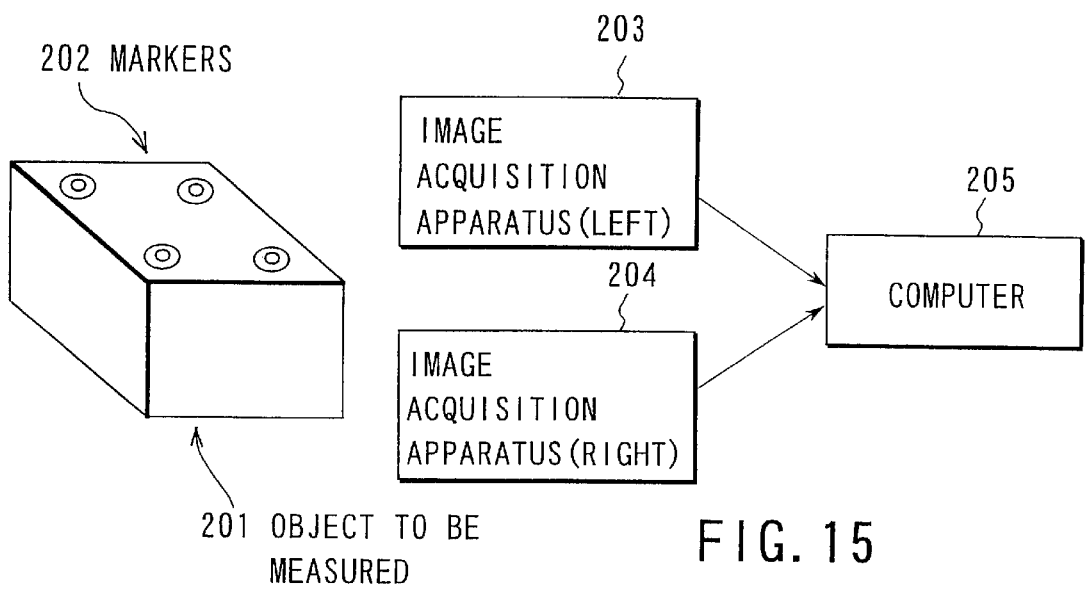
FIG. 15 is a block diagram for showing a concept of a seventh embodiment of the invention.

FIG. 15 is a block diagram for illustrating a conceptional diagram of a system according to the present embodiment.

As shown in FIG. 15, there are prepared a plurality (in this case, two sets, each on the left side and the right side, as an example of utilizing a stereo camera) of image acquisition apparatuses 203 and 204 of which relative positions have been determined in advance. From these image acquisition apparatuses, image acquired data are transmitted to a computer 205 that is a data processing unit.

The computer 205 measures the three-dimensional positional relationship between each of the image acquisition apparatuses 203 and 204 and an object 201 to be measured, or between one of the image acquisition apparatuses 203 and 204 and the object 201, by utilizing the positions of code markers 202 of which positions on the object coordinate system have been determined in advance.

In the present embodiment, it is assumed that the plurality of image acquisition apparatuses have been calibrated in advance based on the sensor reference coordinate system.

In other words, it is assumed that, for each image acquisition apparatus j, a three-dimensional point $(x_i^s, y_i^s, z_i^s)$ defined by the sensor reference coordinate system has been measured at an image position $(u_i^j, v_i^j)$. By utilizing a homogeneous transformation matrix jHs that has already been determined by calibration, it is possible to express a relationship as follows.

(Expression 28)

$$\begin{bmatrix} U_i^j \\ V_i^j \\ W_i^j \end{bmatrix} = \begin{bmatrix} \alpha_u^j & 0 & u_0^j & 0 \\ 0 & \alpha_v^j & v_0^j & 0 \\ 0 & 0 & 0 & 0 \end{bmatrix} {}_jH_s \begin{bmatrix} x_i^s \\ y_i^s \\ z_i^s \\ 1 \end{bmatrix}$$

$$u_i^j = \frac{U_i^j}{W_i^j}, \quad v_i^j = \frac{V_i^j}{W_i^j}$$

where each of $\alpha_M^j$, $\alpha_M^j$, $u_O^j$, $\delta_O^j$ represents a intrinsic camera parameter the image acquisition apparatus j. These values have been made determined by calibration.

When a three-dimensional point $(x_i^m, y_i^m, z_i^m)$ defined by the object coordinate system is considered, the position $(u_i^j, v_i^j)$ at the image acquisition apparatus j can be expressed as follows.

(Expression 29)

$$\begin{bmatrix} U_i^j \\ V_i^j \\ W_i^j \end{bmatrix} = \begin{bmatrix} \alpha_u^j & 0 & u_0^j & 0 \\ 0 & \alpha_v^j & v_0^j & 0 \\ 0 & 0 & 0 & 0 \end{bmatrix} {}_jH_{ss}H_m \begin{bmatrix} x_i^m \\ y_i^m \\ z_i^m \\ 1 \end{bmatrix} \quad (100)$$

$$u_i^j = \frac{U_i^j}{W_i^j}, \quad v_i^j = \frac{V_i^j}{W_i^j}$$

Then, how to estimate the coordinate transformation parameter ${}_sH_m$ for transforming from the object coordinate system given by the above expression to the sensor reference coordinate system, is the subject of the present embodiment.

Figure 16:
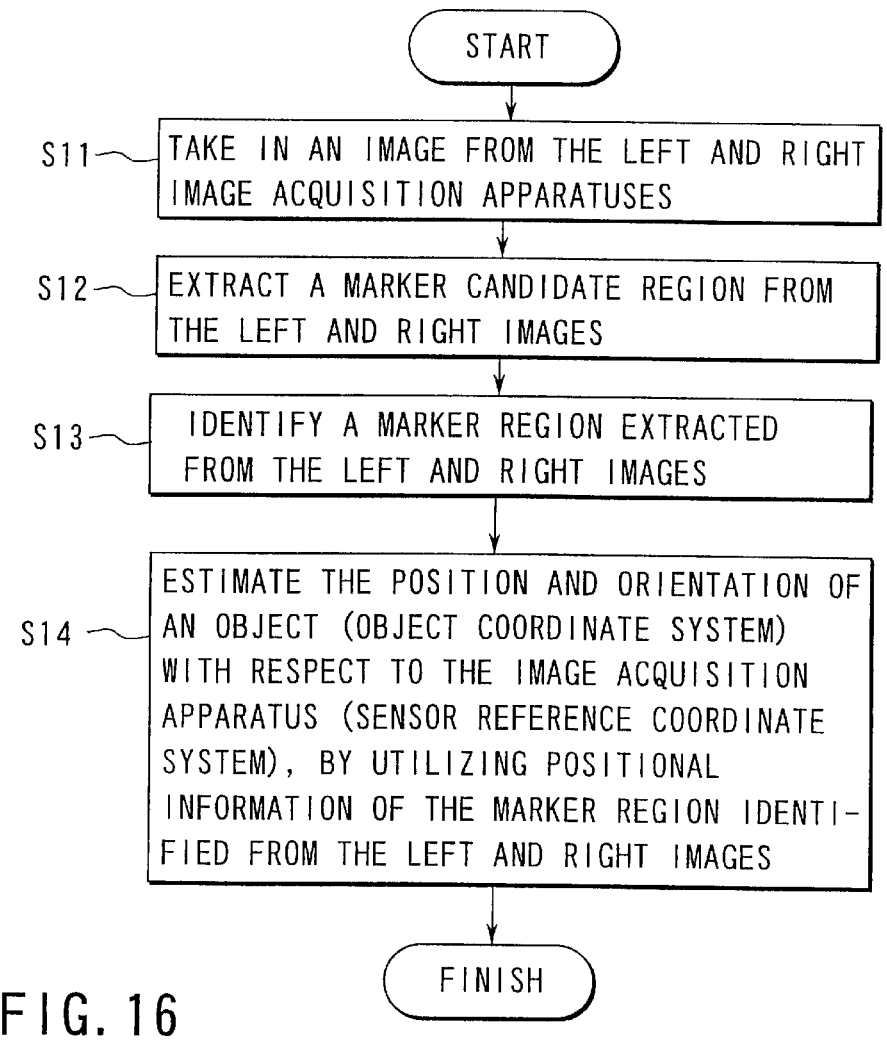
FIG. 16 is a flowchart for showing a processing procedure according to the seventh embodiment.

FIG. 16 is a flowchart for showing a processing procedure of the present embodiment.

In the present system, the computer 205 receives right and left images from the right and left image acquisition apparatuses respectively, and then identifies the code markers in each image, and calculates their positions within each image (steps S11 S12, S13).

For each of the code markers that have been identified from both the right and left images, the computer 205 calculates the three-dimensional position of each code marker in the sensor reference coordinate system from positions of the code marker within the right and left images.

The computer 205 calculates the coordinate transformation parameter for transforming from the object coordinate system to the sensor reference coordinate system, by utilizing the three-dimensional positional coordinates calculated in the sensor reference coordinate system and the three-dimensional positional coordinates defined in the object coordinate system (step S14).

The steps up to the step of identifying code markers from each image (S11, S12, S13) are the same as those in the first embodiment and the second embodiment. Therefore, there will be explained below a step S14 of calculating the coordinate transformation parameter for transforming from the object coordinate system to the sensor reference coordinate system, based on the intra-image positional coordinates of code markers that have been identified from the right and left images.

It is assumed that measured image coordinates of a code marker i obtained from the left image are expressed as $(u_i^1, v_i^1)$ and measured image coordinates of the code marker i obtained from the right image are expressed as $(u_i^2, v_i^2)$.

In this case, it is possible to calculate an estimate of the three-dimensional position in the sensor reference coordinate system as follows.

The following expression is defined first.

(Expression 30)

$$_1H_s = \begin{bmatrix} r_{11}^1 & r_{12}^1 & r_{13}^1 & t_x^1 \\ r_{21}^1 & r_{22}^1 & r_{23}^1 & t_y^1 \\ r_{31}^1 & r_{32}^1 & r_{33}^1 & t_z^1 \\ 0 & 0 & 0 & 1 \end{bmatrix}, \quad _2H_s = \begin{bmatrix} r_{11}^2 & r_{12}^2 & r_{13}^2 & t_x^2 \\ r_{21}^2 & r_{22}^2 & r_{23}^2 & t_y^2 \\ r_{31}^2 & r_{32}^2 & r_{33}^2 & t_z^2 \\ 0 & 0 & 0 & 1 \end{bmatrix}$$

Then, $(u_i^1, v_i^1)$ and $(u_i^2, v_i^2)$ are normalized. Next, the following expression is calculated.

(Expression 31)

$$\tilde{u}_i^1 = \frac{u_i^1 - u_0^1}{\alpha_u^1}, \quad \tilde{v}_i^1 = \frac{v_i^1 - v_0^1}{\alpha_v^1},$$

$$\tilde{u}_i^2 = \frac{u_i^2 - u_0^2}{\alpha_u^2}, \quad \tilde{v}_i^2 = \frac{v_i^2 - v_0^2}{\alpha_v^1},$$

Then, the following expression is obtained from the Expression 100.

(Expression 32)

$$\begin{bmatrix} r_{11}^1 - \tilde{u}_i^1 r_{31}^1 & r_{12}^1 - \tilde{u}_i^1 r_{32}^1 & r_{13}^1 - \tilde{u}_i^1 r_{33}^1 \\ r_{21}^1 - \tilde{v}_i^1 r_{31}^1 & r_{22}^1 - \tilde{v}_i^1 r_{32}^1 & r_{23}^1 - \tilde{v}_i^1 r_{33}^1 \\ r_{11}^2 - \tilde{u}_i^2 r_{31}^2 & r_{12}^2 - \tilde{u}_i^2 r_{32}^2 & r_{13}^2 - \tilde{u}_i^2 r_{33}^2 \\ r_{21}^2 - \tilde{v}_i^2 r_{31}^2 & r_{22}^2 - \tilde{v}_i^2 r_{32}^2 & r_{23}^2 - \tilde{v}_i^2 r_{33}^2 \end{bmatrix} \begin{bmatrix} x_i^s \\ y_i^s \\ z_i^s \end{bmatrix} = \begin{bmatrix} -t_x^1 + \tilde{u}_i^1 t_z^1 \\ -t_y^1 + \tilde{v}_i^1 t_z^1 \\ -t_x^2 + \tilde{u}_i^2 t_z^2 \\ -t_y^2 + \tilde{v}_i^2 t_z^2 \end{bmatrix}$$

In this case, the Expression 34 is obtained from the Expression 33, as follows.

(Expression 33)

$$A = \begin{bmatrix} r_{11}^1 - \tilde{u}_i^1 r_{31}^1 & r_{12}^1 - \tilde{u}_i^1 r_{32}^1 & r_{13}^1 - \tilde{u}_i^1 r_{33}^1 \\ r_{21}^1 - \tilde{v}_i^1 r_{31}^1 & r_{22}^1 - \tilde{v}_i^1 r_{32}^1 & r_{23}^1 - \tilde{v}_i^1 r_{33}^1 \\ r_{11}^2 - \tilde{u}_i^2 r_{31}^2 & r_{12}^2 - \tilde{u}_i^2 r_{32}^2 & r_{13}^2 - \tilde{u}_i^2 r_{33}^2 \\ r_{21}^2 - \tilde{v}_i^2 r_{31}^2 & r_{22}^2 - \tilde{v}_i^2 r_{32}^2 & r_{23}^2 - \tilde{v}_i^2 r_{33}^2 \end{bmatrix},$$

$$b = \begin{bmatrix} -t_x^1 + \tilde{u}_i^1 t_z^1 \\ -t_y^1 + \tilde{v}_i^1 t_z^1 \\ -t_x^2 + \tilde{u}_i^2 t_z^2 \\ -t_y^2 + \tilde{v}_i^2 t_z^2 \end{bmatrix}$$

(Expression 34)

$$\begin{bmatrix} x_i^s \\ y_i^s \\ z_i^s \end{bmatrix} = (A^T A) - {}^1 A^T b$$

An estimate of the three-dimensional position $(x_i^s, y_i^s, z_i^s)$ obtained from the above expression and the three-dimensional position $(x_i^m, y_i^m, z_i^m)$ in the object coordinate system are related by the following rotation matrix R and the translation vector t. Then, it is possible to obtain the rotation matrix R and the translation vector t by the quaternion method as explained in the first embodiment or the second embodiment.

According to the stereo method, there may be at least three code markers that are to be detected.

Thus, it is possible to calculate the coordinate transformation parameter ${}_sH_m$ for transforming from the object coordinate system to the sensor reference coordinate system. In this case, the following expression is established.

(Expression 35)

$$_sH_m = \begin{bmatrix} R & t \\ 0 & 1 \end{bmatrix}$$

According to the present embodiment, it is possible to achieve a stable function of sensing the position and orientation of the object even when the number of code markers is small, by utilizing a plurality of mutually-calibrated image acquisition apparatuses.

According to the present embodiment, there is an effect that the position and orientation of an object is estimated by utilizing a double larger number of code markers than in the case of utilizing a single image acquisition apparatus. Therefore, this method is particularly effective when it is possible to detect only a limited number of markers because of occlusion or the like or when an image acquired by an image acquisition apparatus includes much noise component under a complex environment.

Further, according to markers in claim 22 to be described later, an identification mark has a circular external shape. Therefore, this has an advantage that it is easy to extract the identification mark from an image.

In other words, when the identification mark has a square or triangle external shape, for example, the mark appearing on the image can have substantially different shapes depending on the direction the mark. Therefore, it is difficult to recognize the mark. On the other hand, when the identification mark has a circular external shape, this mark can be approximated by an elliptic shape regardless of the direction of the mark. Therefore, in this case, it is easy to recognize the mark on the image.

Further, according to markers in claim 23 to be described later, there is an effect that it is possible to identify a marker by analyzing the luminance or chromaticity within an area, in addition to the above-described effect of the marker according to claim 22.

Further, according to markers in claim 24 to be described later, there is an effect that it is possible to identify a marker by analyzing the luminance or chromaticity within an-area, in addition to the above-described effect of the marker according to claim 22.

According to the present invention, it is possible to estimate the three-dimensional position and orientation of an object in a robust and stable manner, by employing the above-described system, without an influence of occlusion which it has been difficult to overcome according to the prior art technique.

As the three-dimensional position and orientation sensing apparatus of the present invention can estimate a three-dimensional position of an object in a coordinate system that defines an image acquisition apparatus or other apparatus, it is possible to effectively utilize this invention to accept and inspect an object based on a robotic operation.

As explained above, according to the present invention, there are following advantages.

(1) It is possible to estimate the three-dimensional position and orientation of an object even when a part of markers cannot be observed because of occlusion.

(2) It is possible to estimate the position and orientation of an object based on only three markers, by which it has not been possible to achieve by finding a unique solution according to the prior-art n-point subject.

In the present invention, it is possible to provide a three-dimensional position and orientation sensing apparatus, a three-dimensional position and orientation sensing method, and a three-dimensional position and orientation sensing system to be used for them, including a computer-readable recording medium, a marker and a probe.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional position and orientation sensing apparatus comprising:

image input means for inputting an image acquired by an image acquisition apparatus and showing at least three markers having color or geometric characteristics as one image, three-dimensional positional information of the markers with respect to an object to be measured being known in advance;

region extracting means for extracting a region corresponding to each marker in the image;

marker identifying means for identifying the individual markers based on the color or geometric characteristics of the markers in the extracted regions; and position and orientation calculating means for calculating the three-dimensional position and orientation of the object to be measured with respect to the image acquisition apparatus, by using positions of the identified markers in the image input to the image input means, and the three-dimensional positional information of the markers with respect to the object to be measured.

2. A three-dimensional position and orientation sensing apparatus comprising:

image input means for inputting an image acquired by an image acquisition apparatus and showing at least four markers having color or geometric characteristics as one image, three-dimensional positional information of the markers with respect to an object to be measured being known in advance;

region extracting means for extracting an area corresponding to each marker in the image;

marker identifying means for identifying the individual markers based on the color or geometric characteristics of the markers in the extracted regions;

marker selecting means for selecting three markers from the markers identified by the marker identifying means;

parameter calculating means for calculating a plurality of sets of parameters for calculating the three-dimensional position and orientation of the object to be measured with respect to the image acquisition apparatus, by utilizing positions of the three markers in the image input to the image input means which are selected by the marker selecting means and three-dimensional positional information of each marker with respect to the object to be measured; and parameter selecting means for selecting one set of parameters by evaluating application of the parameters calculated by the parameter calculating means, to markers not selected by the marker selecting means.

3. A three-dimensional position and orientation sensing apparatus according to claim 2, further comprising parameter improving means for improving one set of parameters selected by the parameter selecting means, by evaluating the set of parameters through application thereto of three-dimensional positional information of each marker with respect to the object to be measured.

4. A three-dimensional position and orientation sensing apparatus comprising:
  image input means for inputting an image acquired by an image acquisition apparatus and showing at least three markers having color or geometric characteristic as one image, three-dimensional positional information of the markers with respect to an object to be measured being known in advance;
  region extracting means for extracting a region corresponding to each marker in the image;
  marker identifying means for identifying the individual markers based on the color or geometric characteristics of the markers in the extracted regions;
  distance estimating means for estimating a distance from the image acquisition apparatus to each marker based on a size of the extracted region in the image including the identified marker; and
  position and orientation calculating means for calculating the three-dimensional position and orientation of the object with respect to the image acquisition apparatus, by using the estimated distance to each marker, a position of the marker in the image and three-dimensional positional information of this marker with respect to the object.

5. A three-dimensional position and orientation sensing apparatus according to claim 4, further comprising:
  feature extracting means for extracting features of the object to be measured, from the image; and
  means for calibrating the position and orientation of the calculated object, from the position of the extracted features.

6. A three-dimensional position and orientation sensing apparatus comprising:
  image input means for inputting an image acquired by an image acquisition apparatus and having markers, including color or geometric characteristics as one image, three-dimensional positional information of which with respect to an object to be measured is known in advance;
  region extracting means for reducing the size of the input image and extracting a region corresponding to each marker in the reduced image; and
  position and orientation calculating means for calculating the three-dimensional position and orientation of the object with respect to the image acquisition apparatus, by using the extracted position of each marker in the image and three-dimensional positional information of each marker with respect to the object.

7. A three-dimensional position and orientation sensing apparatus according to claim 6, further comprising:
  feature extracting means for extracting features of the object to be measured, from the image; and
  means for calibrating the position and orientation of the calculated object, from the position of the extracted features in the image.

8. A three-dimensional position and orientation sensing method for measuring the position and orientation of an object to be measured with respect to an image acquisition apparatus, by analyzing an image acquired by this image acquisition apparatus, the method comprising the steps of:
  inputting an image acquired by an image acquisition apparatus and showing at least three markers having color or geometric characteristics as one image, three-dimensional positional information of the markers with respect to an object to be measured being known in advance;
  extracting a region corresponding to each marker in the image;
  identifying the individual markers based on the color or geometric characteristics of the markers in the extracted regions; and
  calculating the three-dimensional position and orientation of the object to be measured with respect to the image acquisition apparatus, by using positions of the identified markers in the image input to the image input in the inputting step, and the three-dimensional positional information of the markers with respect to the object to be measured.

9. A three-dimensional position and orientation sensing method for measuring a position and orientation of an object to be measured with respect to an image acquisition apparatus, by analyzing an image acquired by this image acquisition apparatus, the method comprising the steps of:
  inputting an image acquired by an image acquisition apparatus and showing at least four markers having color or geometric characteristics as one image, three-dimensional positional information of the markers with respect to an object to be measured being known in advance;
  extracting a region corresponding to each marker in the image;
  identifying the individual markers based on the color or geometric characteristics of the markers in the extracted regions;
  selecting three markers from the markers identified by the marker identifying means;
  calculating a plurality of sets of parameters for calculating the three-dimensional position and orientation of the object to be measured with respect to the image acquisition apparatus, by utilizing positions of the three markers in the image input in the inputting step which are selected by the marker selecting means and three-dimensional positional information of each marker with respect to the object; and
  selecting one set of parameters by evaluating application of the parameters calculated by the parameter calculating means, to markers not selected by the marker selecting means.

10. A three-dimensional position and orientation sensing method according to claim 9, further comprising the step of improving one set of parameters selected by the parameter selecting means, by evaluating the set of parameters through application thereto of three-dimensional positional information of each marker with respect to the object.

11. A three-dimensional position and orientation sensing method for measuring the position and orientation of an object to be measured with respect to an image acquisition apparatus, by analyzing an image acquired by this image acquisition apparatus, the method comprising the steps of:
  inputting an image acquired by an image acquisition apparatus and showing at least three markers having color or geometric characteristics as one image, three-dimensional positional information of the markers with respect to an object to be measured being known in advance;
  extracting a region corresponding to each marker in the image;
  identifying the individual markers based on the color or geometric characteristics of the markers in the extracted regions;

estimating a distance from the image acquisition apparatus to each marker based on a size of the extracted region in the image including the identified marker; and calculating the three-dimensional position and orientation of the object to be measured with respect to the image acquisition apparatus, by using the estimated distance to each marker, a position of the marker in the image and three-dimensional positional information of this marker with respect to the object.

12. A three-dimensional position and orientation sensing method according to claim 11, further comprising the steps of:

extracting features of the object to be measured, from the image; and calibrating the position and orientation of the calculated object, from a position of the extracted features in the image.

13. A three-dimensional position and orientation sensing method for measuring the position and orientation of an object to be measured with respect to an image acquisition apparatus, by analyzing an image acquired by this image acquisition apparatus, the method comprising the steps of:

inputting an image acquired by an image acquisition apparatus and having markers, including color or geometric characteristics as one image, three-dimensional positional information of which with respect to an object to be measured is known in advance;

reducing the input image and extracting a region corresponding to each marker on the reduced image; and calculating the three-dimensional position and orientation of the object to be measured with respect to the image acquisition apparatus, by using the extracted position of each marker in the image and three-dimensional positional information of each marker with respect to the object to be measured.

14. A three-dimensional position and orientation sensing method according to claim 13, further comprising the steps of:

extracting features of the object to be measured, from the image; and calibrating the position and orientation of the calculated object, from positions of the extracted features in the image.

15. An article of manufacture comprising a computer-readable recording medium having computer-readable program coding means as a processing program recorded for measuring the position and orientation of an object to be measured with respect to an image acquisition apparatus, by analyzing by computer an image acquired by this image acquisition apparatus, the computer-readable program coding means comprising:

computer-readable programming means for making an image to be input, the image having been acquired by an image acquisition apparatus and showing at least three markers having color or geometric characteristics as one image, three-dimensional positional information of the markers with respect to an object to be measured being known in advance;

computer-readable programming means for making a region corresponding to each marker in the image to be extracted;

computer-readable programming means for making the individual markers to be identified based on the color or geometric characteristics of the markers in the extracted regions; and computer-readable programming means for making the three-dimensional position and orientation of the object to be measured with respect to the image acquisition apparatus to be calculated, by using positions of the identified markers in the image input by the computer-readable programming means, and the three-dimensional positional information of the markers with respect to the object to be measured.

16. An article of manufacture comprising a computer-readable recording medium having computer-readable program coding means as a processing program recorded for measuring the position and orientation of an object to be measured with respect to an image acquisition apparatus, by analyzing by computer an image acquired by this image acquisition apparatus, the computer-readable program coding means comprising:

computer-readable programming means for making an image to be input, the image having been acquired by an image acquisition apparatus and showing at least four markers having color and geometric characteristics as one image, three-dimensional positional information of the markers with respect to an object to be measured being known in advance;

computer-readable programming means for making a region corresponding to each marker in the image to be extracted, making the individual markers to be identified based on the color or geometric characteristics of the markers in the extracted regions, and making three markers to be selected from the identified markers;

computer-readable programming means for making a plurality of sets of parameters for calculating the three-dimensional position and orientation of the object to be measured with respect to the image acquisition apparatus to be calculated, by using positions of the selected three markers in the image input by the computer-readable programming means, and the three-dimensional positional information of the markers with respect to the object to be measured; and computer-readable programming means for making one set of parameters selected, by evaluating the non-selected markers through application of the calculated parameters thereto.

17. An article of manufacture comprising a computer-readable recording medium storing a three-dimensional position and orientation sensing processing program according to claim 16, wherein the computer-readable program coding means as a processing program further comprises:

computer-readable programming means for making one set of parameters selected by the parameter selecting means to be improved, by evaluating the set of parameters through application thereto of three-dimensional positional information of each marker with respect to the object.

18. An article of manufacture comprising a computer-readable recording medium having computer-readable program coding means as a processing program recorded for measuring the position and orientation of an object to be measured with respect to an image acquisition apparatus, by analyzing by computer an image acquired by this image acquisition apparatus, the computer-readable program coding means comprising:

computer-readable programming means for making an image to be input, the image having been acquired by an image acquisition apparatus and showing at least three markers having color or geometric characteristics as one image, three-dimensional positional information of the markers with respect to an object to be measured being known in advance;

computer-readable programming means for making a region corresponding to each marker in the image to be extracted;

computer-readable programming means for making the individual markers to be identified based on the color or geometric characteristics of the markers in the extracted regions;

computer-readable programming means for making a distance from the image acquisition apparatus to each marker to be estimated based on a size of the identified marker in the image; and computer-readable programming means for making the three-dimensional position and orientation of the object to be measured with respect to the image acquisition apparatus to be calculated, by using the estimated distance to each marker, a position of the marker in the image and three-dimensional positional information of this marker with respect to the object to be measured.

19. An article of manufacture comprising a computer-readable recording medium storing a three-dimensional position and orientation sensing processing program according to claim 18, wherein the computer-readable program coding means as a processing program further comprises:

computer-readable programming means for making features of the object to be measured, to be extracted from the image, and making the position and orientation of the calculated object to be calibrated, from a position of the extracted features.

20. An article of manufacture comprising a computer-readable recording medium having computer-readable program coding means as a processing program recorded for measuring the position and orientation of an object to be measured with respect to an image acquisition apparatus, by analyzing by computer an image acquired by this image acquisition apparatus, the computer-readable program coding means comprising:

computer-readable programming means for making an image to be input, the image having been acquired by an image acquisition apparatus and having markers, including color or geometric characteristics as one image, three-dimensional positional information of which with respect to an object to be measured is known in advance;

computer-readable programming means for making the input image to be reduced and making a region corresponding to each marker to be extracted on the reduced image; and computer-readable programming means for making the three-dimensional position and orientation of the object to be measured with respect to the image acquisition apparatus to be calculated, by using the extracted position of each marker in the image and three-dimensional positional information of each marker with respect to the object.

21. An article of manufacture comprising a computer-readable recording medium storing a three-dimensional position and orientation sensing processing program according to claim 20, wherein the computer-readable program coding means as a processing program further comprises:

computer-readable programming means for making features of the object to be measured, to be extracted from the image, and making the position and orientation of the calculated object to be calibrated, from a position of the extracted features in the image.

22. An apparatus for measuring a relative three-dimensional position and orientation of an object with respect to an image acquisition apparatus by measuring image positions of at least three markers mounted on the object or near the object, based on an image showing the markers, acquired by the image acquisition apparatus, wherein the markers have color or geometric characteristics as one image, and three-dimensional positions of the markers are known in advance, and the measuring apparatus comprising:

means for extracting a region corresponding to each of the markers from within the image of the markers;

means for identifying the individual markers by calculating color or geometric characteristics of the region corresponding to each of the markers within the image; and means for estimating the relative three-dimensional position and orientation of the object with respect to the image acquisition apparatus, based on the three-dimensional positions of the markers.

23. A three-dimensional position and orientation sensing apparatus according to claim 22, wherein coded patterns are disposed within the individual markers.

24. A three-dimensional position and orientation sensing apparatus according to claim 23, wherein a circular marker is utilized as each marker, and small patterns of different colors are used as a code within the marker.

25. A three-dimensional position and orientation sensing apparatus according to claim 23, wherein patterns of different colors are generated on a concentric circle as the maker.

26. A three-dimensional position and orientation sensing apparatus according to claim 22, wherein the means for identifying the individual markers by calculating geometric characteristics of the region of each marker within the image measures the size of the region of each marker within the image, and the means for estimating the relative three-dimensional position and orientation of the object with respect to the image acquisition apparatus calculates an initial estimate of the distance between the image acquisition apparatus and a marker based on the measured value of the size of the marker region, and calculates the relative three-dimensional position and orientation of the object with respect to the image acquisition apparatus based on the initial estimate.

27. A three-dimensional position and orientation sensing apparatus according to claim 26, wherein an estimate value is calculated by utilizing only a marker that takes a range which makes it possible to estimate the relative distance.

28. A three-dimensional position and orientation sensing apparatus according to claim 26, wherein an estimate error variance is calculated for the estimated relative distance, and the three-dimensional position and orientation of the object with respect to the image acquisition apparatus is estimated by taking both the estimate value and the error variance into consideration.

29. A three-dimensional position and orientation sensing apparatus according to claim 26, wherein the markers are circular markers, a projected image of each marker within the image is approximated to an ellipse, and the distance from the image acquisition apparatus to each marker is estimated by utilizing the length of the long axis of the ellipse.

30. A three-dimensional position and orientation sensing apparatus according to claim 29, wherein a circular marker is utilized as each marker.

31. A three-dimensional position and orientation sensing apparatus according to claim 29, wherein a three-dimensional positional sensing is carried out by adding direction information of the circular marker.

32. A three-dimensional position and orientation sensing apparatus according to claim 22, wherein, for extracting a marker region from an original image, the apparatus generates a reduced image of the original image, extracts a candidate region that is considered to correspond to a marker from the reduced image, calculates the area of the candidate region within the original image, and then extracts and recognizes a region corresponding to the marker within the original image.

33. A three-dimensional position and orientation sensing apparatus according to claim 22, wherein, after a marker having unique geometric characteristics has been recognized, the apparatus extracts from within the image a separate marker having no unique geometric characteristics, by utilizing a two-dimensional or three-dimensional positional relationship of the first marker, and updates the three-dimensional position and orientation parameter of the object with respect to the image acquisition apparatus, by utilizing the three-positional position of the marker with respect to the image acquisition apparatus.

34. A three-dimensional position and orientation sensing apparatus according to claim 22, wherein the image acquisition apparatus acquires a plurality of images and utilizes the plurality of images.

35. A three-dimensional position and orientation sensing apparatus according to claim 22, wherein markers are mounted on the plane of a sensor probe, and the sensor probe is used as an object to be measured, whereby to estimate the relative position and orientation of the sensor probe and to measure the position of a probe tip of the sensor probe.

36. A three-dimensional position and orientation sensing apparatus comprising:
   an image input section which inputs an image acquired by an image acquisition apparatus and showing at least three markers having color or geometric characteristics as one image, three-dimensional positional information of the markers with respect to an object to be measured being known in advance;
   a region extracting section which extracts a region corresponding to each marker in the image;
   a marker identifying section which identifies the individual markers based on the color or geometric characteristics of the markers in the extracted regions; and
   a position and orientation calculating section which calculates the three-dimensional position and orientation of the object to be measured with respect to the image acquisition apparatus, by using positions of the identified markers in the image input to the image input section, and the three-dimensional positional information of the markers with respect to the object to be measured.

37. A three-dimensional position and orientation sensing apparatus comprising:
   an image input section which inputs an image acquired by an image acquisition apparatus and showing at least four markers having color or geometric characteristics as one image, three-dimensional positional information of the markers with respect to an object to be measured being known in advance;
   a region extracting section which extracts an area corresponding to each marker in the image;
   a marker identifying section which identifies the individual markers based on the color or geometric characteristics of the markers in the extracted regions;
   a marker selecting section which selects three markers from the markers identified by the marker identifying section;
   a parameter calculating section which calculates a plurality of sets of parameters for calculating the three-dimensional position and orientation of the object to be measured with respect to the image acquisition apparatus, by utilizing positions of the three markers in the image input to the image input section which are selected by the marker selecting section and three-dimensional positional information of each marker with respect to the object to be measured; and
   a parameter selecting section which selects one set of parameters by evaluating application of the parameters calculated by the parameter calculating section, to markers not selected by the marker selecting section.

38. A three-dimensional position and orientation sensing apparatus comprising:
   a image input section which inputs an image acquired by an image acquisition apparatus and showing at least three markers having color or geometric characteristic as one image, three-dimensional positional information of the markers with respect to an object to be measured being known in advance;
   a region extracting section which extracts a region corresponding to each marker in the image;
   a marker identifying section which identifies the individual markers based on the color or geometric characteristics of the markers in the extracted regions;
   a distance estimating section which estimates a distance from the image acquisition apparatus to each marker based on a size of the extracted region in the image including the identified marker; and
   a position and orientation calculating section which calculates the three-dimensional position and orientation of the object with respect to the image acquisition apparatus, by using the estimated distance to each marker, a position of the marker in the image and three-dimensional positional information of this marker with respect to the object.

39. A three-dimensional position and orientation sensing apparatus comprising:
   an image input section which inputs an image acquired by an image acquisition apparatus and having markers, including color or geometric characteristics as one image, three-dimensional positional information of which with respect to an object to be measured is known in advance;
   a region extracting section which reduces the size of the input image and extracting a region corresponding to each marker in the reduced image; and
   a position and orientation calculating section which calculates the three-dimensional position and orientation of the object with respect to the image acquisition apparatus, by using the extracted position of each marker in the image and three-dimensional positional information of each marker with respect to the object.

40. An apparatus for measuring a relative three-dimensional position and orientation of an object with respect to an image acquisition apparatus by measuring image positions of at least three markers mounted on the object or near the object, based on an image showing the markers, acquired by the image acquisition apparatus, wherein the markers have color or geometric characteristics as one image and three-dimensional positions of the markers are known in advance, and the measuring apparatus comprising:

a section which extracts a region corresponding to each of the markers from within the image of the markers;

a section which identifies the individual markers by calculating color or geometric characteristics of the region corresponding to each of the markers within the image; and a section which estimates the relative three-dimensional position and orientation of the object with respect to the image acquisition apparatus, based on the three-dimensional positions of the markers.

\* \* \* \* \*